US012717953B2

(12) United States Patent
Fulton et al.

(10) Patent No.: US 12,717,953 B2
(45) Date of Patent: Aug. 25, 2026

(54) LABELS FOR DATA SECURITY SYSTEM ASSET MANAGEMENT

(71) Applicant: Lucidum Inc., Cincinnati, OH (US)

(72) Inventors: Joel M. Fulton, Cincinnati, OH (US); Jeremy Sherwood, Beaverton, OR (US); Shuning Wu, Mountain View, CA (US); Kai Yan, Austin, TX (US); Sheena Abshire, Jack, AL (US)

(73) Assignee: Lucidum Inc., Cincinnati, OH (US)

( * ) Notice: Subject to any disclaimer, the term of this patent is extended or adjusted under 35 U.S.C. 154(b) by 142 days.

(21) Appl. No.: 18/889,643

(22) Filed: Sep. 19, 2024

(65) Prior Publication Data

US 2026/0080082 A1 Mar. 19, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS 8,555,071 B2 * 10/2013 Choi ..................... H04L 9/3239 705/64
10,181,049 B1 * 1/2019 El Defrawy ............ H04L 9/085
10,706,167 B1 * 7/2020 Sokolov .............. G06F 21/6218
10,990,689 B1 * 4/2021 Reiner .................. G06F 21/604
11,182,407 B1 * 11/2021 Yarlagadda ........... G06F 16/254
11,669,630 B1 * 6/2023 Arikatla .............. G06F 21/6218 726/1
11,734,282 B1 * 8/2023 Le ......................... G06F 16/285 707/737
11,977,539 B1 * 5/2024 Jacobs .................. G06F 16/258
11,979,489 B1 * 5/2024 Robbins ................ H04L 9/0891
12,117,977 B1 * 10/2024 Sosna ................... G06F 16/211
12,120,127 B1 * 10/2024 Grube ................. G06F 21/6218
12,210,645 B1 * 1/2025 Brahmbhatt ........ G06F 21/6227
12,242,651 B1 * 3/2025 Manton ............... G06F 21/6263
12,411,963 B1 * 9/2025 Rodriguez Munoz ....................... H04L 9/3213
12,505,234 B1 * 12/2025 Chen ..................... G06F 21/602
12,554,873 B1 * 2/2026 Bendert .............. G06F 21/6218
2003/0126434 A1 * 7/2003 Lim .................... G06F 21/6218 713/164
2006/0047692 A1 * 3/2006 Rosenblum ............. G06F 16/48 707/999.102
2007/0276991 A1 * 11/2007 Jaquette ............. G06F 21/6218 711/111

(Continued)

*Primary Examiner* — Aravind K Moorthy
(74) *Attorney, Agent, or Firm* — Holland & Hart LLP

(57) ABSTRACT

Methods, systems, and devices for generating and applying function-based and/or rule-based labels to data records for a data security system are described. Such labels may be used for querying of data records. A user of a data security system may define metadata criteria for triggering generation of a label. In some examples, the user may define a function that may transform the metadata that satisfies the triggering criteria for a data record into a label to apply to the data record. In some examples, the user may define a rule that indicates a label to apply to the data record(s) that satisfy the metadata criteria. A user may query the database for records based on the labels applied to the data records in a consistent format expected by the administrative user.

20 Claims, 10 Drawing Sheets

(56) References Cited

U.S. PATENT DOCUMENTS

2008/0005588 A1* 1/2008 Watson ............... G06F 21/6218 713/193
2008/0177701 A1* 7/2008 Merritt .................... G06F 16/13
2010/0263060 A1* 10/2010 Charbonneau .......... G06F 21/62 726/30
2011/0099163 A1* 4/2011 Harris ................... G06F 16/907 707/723
2011/0145593 A1* 6/2011 Auradkar ............. H04L 9/0833 713/189
2012/0110323 A1* 5/2012 Colclasure .......... G06F 21/6218 713/153
2013/0006976 A1* 1/2013 Megler ................. G06F 16/242 707/723
2013/0191322 A1* 7/2013 Sugano ............... G06F 21/6218 707/602
2014/0096048 A1* 4/2014 Rottler .................. G06F 3/0486 715/769
2014/0258336 A1* 9/2014 Scott ................... G06F 21/6227 707/E17.014
2014/0344571 A1* 11/2014 Adam ................. G06F 21/6218 713/165
2014/0373177 A1* 12/2014 Arning .................. G06F 21/604 726/28
2015/0113002 A1* 4/2015 Nadarajah ........... G06F 16/9535 707/754
2015/0154418 A1* 6/2015 Redberg .................. H04L 63/20 713/165
2015/0186668 A1* 7/2015 Whaley ............... G06F 16/2379 713/176
2015/0341323 A1* 11/2015 Shaw ...................... G06F 21/79 380/278
2016/0004734 A1* 1/2016 Naryzhny ............... G06F 16/22 707/736
2016/0078243 A1* 3/2016 Bruso ................ G06F 21/6218 726/27
2016/0078245 A1* 3/2016 Amarendran .......... G06N 20/00 713/193
2016/0217295 A1* 7/2016 Goldsack ............ G06F 21/6254
2017/0177368 A1* 6/2017 DeHon ............... G06F 12/1408
2017/0308714 A1* 10/2017 Drost-Hansen ... G06F 16/24573
2017/0337382 A1* 11/2017 Alonzo ................... G06F 21/10
2017/0357817 A1* 12/2017 Tamura ................. H04L 9/0822
2018/0032739 A1* 2/2018 Gupta ................... G06F 21/602
2018/0091306 A1* 3/2018 Antonopoulos .... H04L 63/0442
2018/0145983 A1* 5/2018 Bestler .................... H04L 63/08
2018/0375838 A1* 12/2018 Hersans .............. G06F 21/6218
2019/0392164 A1* 12/2019 Dutta .................... H04L 9/0825
2020/0076578 A1* 3/2020 Ithal .................... H04L 63/0272
2020/0104523 A1* 4/2020 Theimer ............... G06F 16/172
2020/0167362 A1* 5/2020 Punuru ................. G06F 16/252
2020/0272601 A1* 8/2020 Kikushima ......... G06F 21/6209
2020/0285775 A1* 9/2020 Zankharia ........... G06F 21/6281
2020/0296140 A1* 9/2020 Buchner ............. G06F 21/6218
2020/0356689 A1* 11/2020 McEnroe ............ H04L 63/0414
2021/0004479 A1* 1/2021 Ithal ...................... H04L 9/0897
2021/0089220 A1* 3/2021 Gkoulalas-Divanis ...................... G06F 21/6245
2021/0141830 A1* 5/2021 Tanner .................. H04L 9/3239
2021/0173953 A1* 6/2021 Mastenbrook ........ H04L 9/0841
2021/0182413 A1* 6/2021 Agarwal ............. G06F 21/6218
2021/0256147 A1* 8/2021 Gupta ................. G06F 21/6218
2021/0279305 A1* 9/2021 Goldston ................ G06F 16/41
2022/0004644 A1* 1/2022 Albero ................ G06F 21/6218
2022/0043927 A1* 2/2022 Sofer .................. G06F 21/6218
2022/0147629 A1* 5/2022 Vasilenko ............ G06N 3/0499
2022/0164396 A1* 5/2022 Seth ................. G06F 16/90344
2022/0188459 A1* 6/2022 Khare ..................... G06F 21/64
2022/0188719 A1* 6/2022 Ramaswamy ........ G06F 21/552
2022/0245268 A1* 8/2022 Dhawan ................ G06F 21/602
2022/0253454 A1* 8/2022 Punuru ............... G06F 21/6218
2022/0253864 A1* 8/2022 Siemiatkowski .... G06Q 20/386
2022/0284039 A1* 9/2022 Fouda ................. H04L 67/1095
2022/0327233 A1* 10/2022 Vedula ................ G06F 21/6218
2022/0343768 A1* 10/2022 Di Cosola ................ G08G 5/55
2022/0374832 A1* 11/2022 Nguyen ............... G06K 7/1443
2022/0391368 A1* 12/2022 Naryzhny ........... G06F 21/6218
2023/0102392 A1* 3/2023 Nomura .................. G06F 3/067 711/154
2023/0186384 A1* 6/2023 Cai ........................ G06Q 40/02 705/38
2023/0205908 A1* 6/2023 Kostushko .......... G06F 21/6218 726/26
2023/0259640 A1* 8/2023 Metzler ............... G06F 21/6218 713/191
2023/0308285 A1* 9/2023 Grover ................ G06F 21/6218
2023/0353599 A1* 11/2023 Payment ................. H04L 63/20
2023/0409725 A1* 12/2023 Burke ................. G06F 21/6218
2024/0012717 A1* 1/2024 Mitkar ................ G06F 11/1448
2024/0054195 A1* 2/2024 Hassan ..................... G06F 3/16
2024/0070275 A1* 2/2024 Cirlig .................... G06F 21/566
2024/0111885 A1* 4/2024 Arikatla ................ G06F 21/604
2024/0169080 A1* 5/2024 Gowda ............... G06F 21/6218
2024/0311494 A1* 9/2024 Devireddy ............ G06F 21/602
2025/0061377 A1* 2/2025 Ngo ....................... G06N 20/10
2025/0070970 A1* 2/2025 Herman .................... H04L 9/14
2025/0094637 A1* 3/2025 Lewis ................. G06F 21/6245
2025/0200076 A1* 6/2025 Ivaturi .............. G06F 16/24573
2025/0200204 A1* 6/2025 Maikhuri ............ G06F 21/6245
2025/0307005 A1* 10/2025 McCay ................. G06F 9/5027
2025/0322090 A1* 10/2025 Hensley .............. G06F 21/6218
2025/0378159 A1* 12/2025 Levin .................... G06F 21/554
2025/0392774 A1* 12/2025 Ullah ................... H04N 21/251
2026/0057072 A1* 2/2026 Agrawal ............... G06F 21/564
2026/0064632 A1* 3/2026 Sharon .................... G06F 16/13

* cited by examiner

Figure 3:
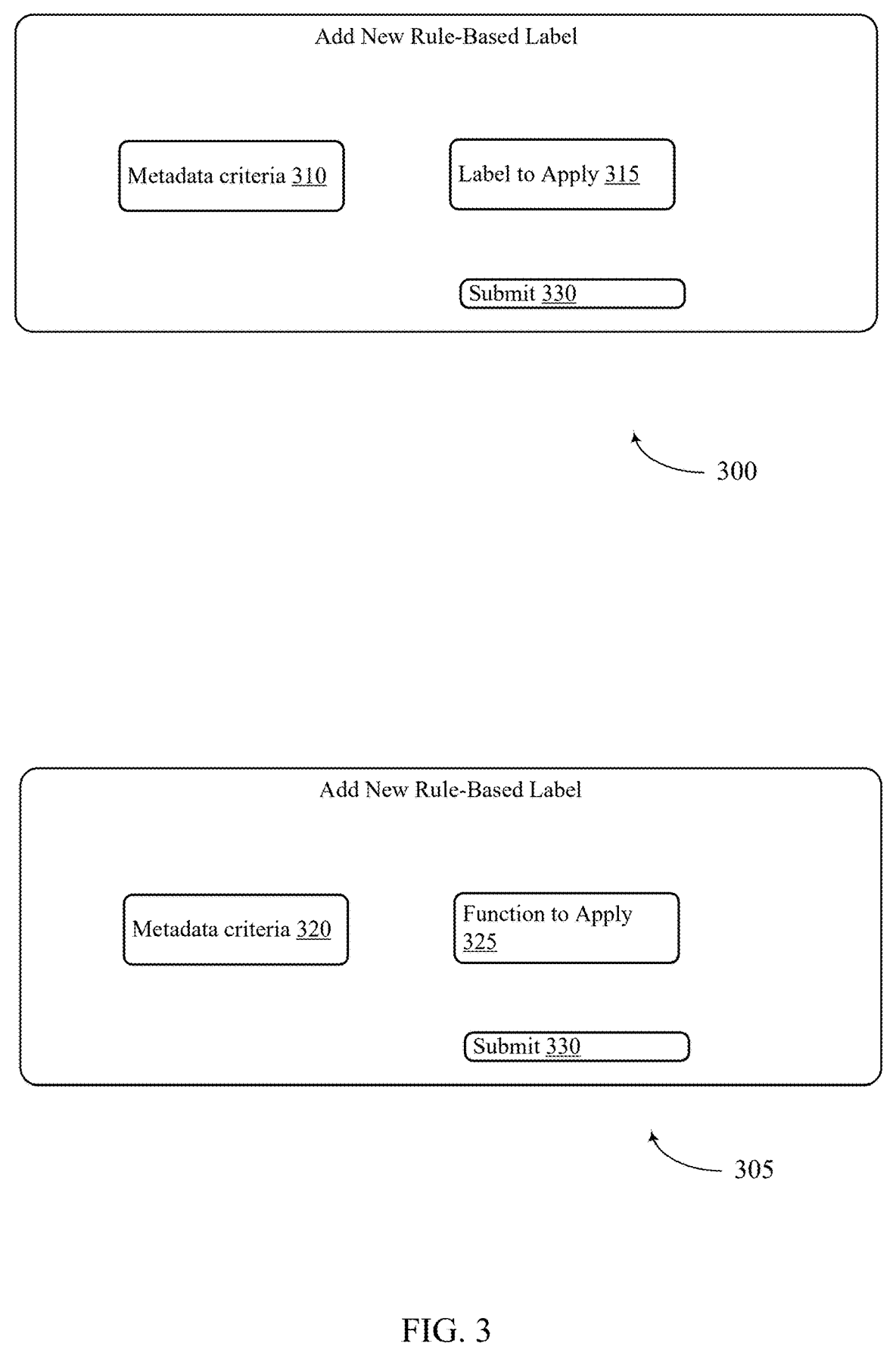

Add New Rule-Based Label

Metadata criteria 310

Label to Apply 315

Submit 330

300

Add New Rule-Based Label

Metadata criteria 320

Function to Apply 325

Submit 330

LABELS FOR DATA SECURITY SYSTEM ASSET MANAGEMENT

FIELD OF TECHNOLOGY

The present disclosure relates generally to database systems and data processing, and more specifically to labels for data security system asset management.

BACKGROUND

A data security system may be employed to detect and manage data security risks associated with one or more computing assets. The data monitored by the data security system may be generated, stored, or otherwise used by the one or more computing assets, examples of which may include mobile phones, tablet computers, personal computers, servers, databases, virtual machines, cloud computing systems, file systems (e.g., network-attached storage (NAS) systems), or other data storage or processing systems. For example, a data security system may monitor for malware and/or suspicious activity within the one or more computing assets. In some examples, a data security system may receive indications of known types of malware from one or more malware information sources. The data security system may monitor the one or more computing assets for the known types of malware.

BRIEF DESCRIPTION OF THE DRAWINGS

FIG. 3 shows an example of a user interface (UI) view that supports labels for data security system asset management in accordance with aspects of the present disclosure.

DETAILED DESCRIPTION

Figure 1:
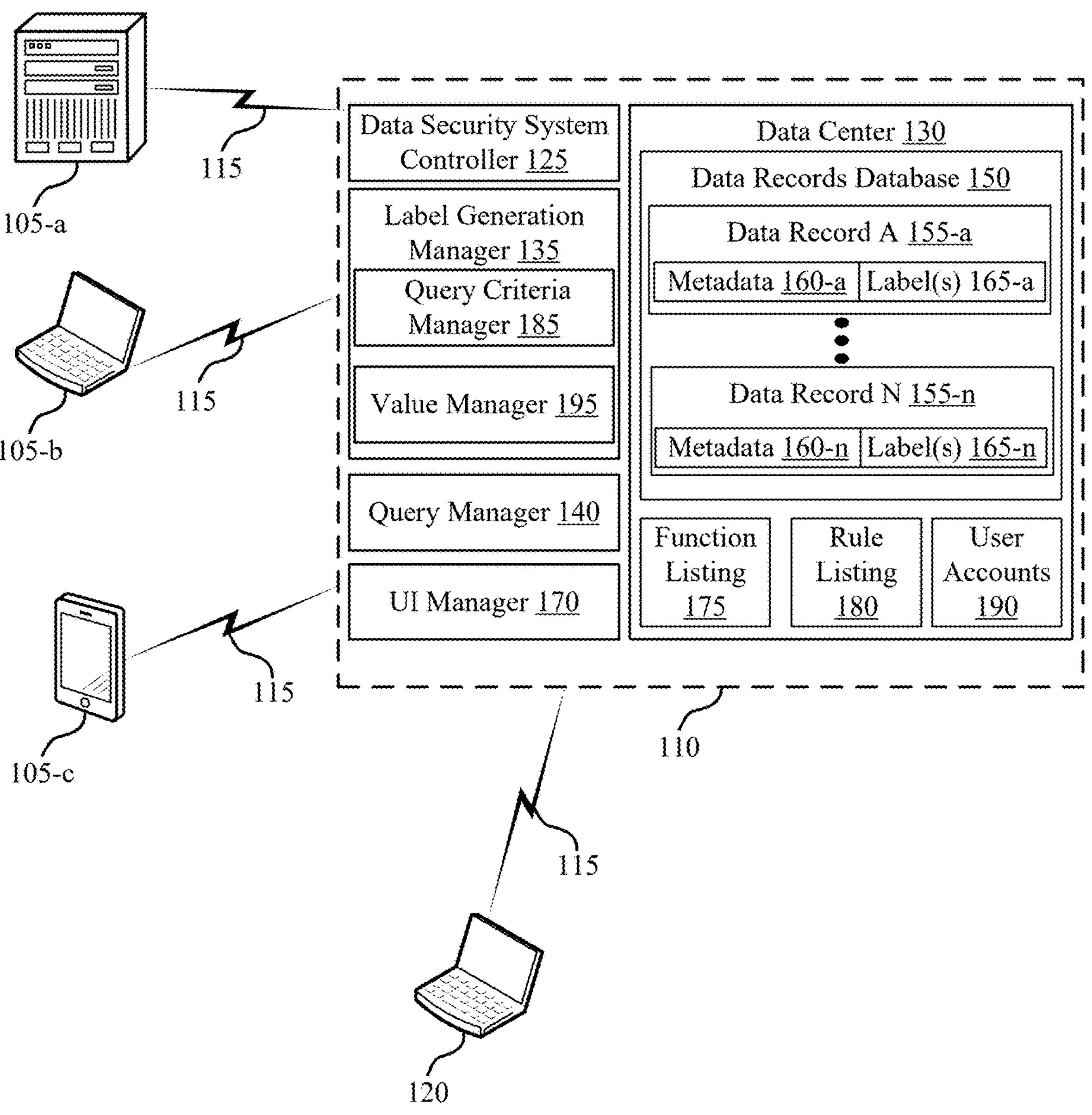
FIG. 1 illustrates an example of a computing environment that supports labels for data security system asset management in accordance with aspects of the present disclosure.

A data security system may be employed to monitor for and manage data security risks associated with one or more computing or assets. For example, the one or more computing assets may be associated with an entity which may be a customer or subscriber of the data security system. For example, an entity may be an individual or an organization. A computing asset may be any device, physical or virtual, capable of processing, storing, transmitting, and/or receiving data. For example, a computing asset may be a stationary device (e.g., a desktop computer or access point) or a mobile device (e.g., a laptop computer, a tablet computer, or a smart phone). As another example, a computing asset may be a commercial computing device, such as a server or collection of servers. In some examples, a computing asset may be a virtual device (e.g., a virtual machine). In some examples, the data security system may scan (e.g., periodically or on-demand) or may otherwise monitor for security risks based on computing objects (e.g., files, software applications, or any other programming elements) stored at or accessible to the computing assets. For example, the data security system may store a listing of known malware, and the data security system may monitor for the known malware within the computing assets monitored by the data security system. As another example, a data security system may monitor for suspicious activity on or associated with one or more computing assets. For example, the data security system may track which user accounts access and/or otherwise use computing assets, and the data security system may track unauthorized access to computing assets or computing resources.

In some cases, the data security system may be responsible for hundreds or thousands of physical and virtual computing assets across multiple networks that may collectively generate thousands or millions of data records. For example, data records may include incident reports for the detection of suspicious activity or malware. As another example, a data record may include the addition of a computing asset to an organization or a network. As another example, a data record may include information such as records of scans of computing assets (e.g., which may or may not reveal suspicious activity). As another example, a data record may involve an action performed by the data security system, such as blocking the download of a virus or removal of a virus or malware from a computing asset. The data security system may store data records for monitored organizations (e.g., data records generated in association with monitoring computing assets) in a database. Given the quantity of data records generated across a monitored system, an administrative user of the data security system may search across thousands or millions of records to find a relevant data record. For example, data records may involve unstructured strings generated by computing systems in a format that is not easily readable for a human administrator. Data records may also include associated metadata, such as date-time metadata fields, metadata fields that indicate a source computing asset (e.g., by device identifier, operating system, etc.), or metadata fields that indicate a user account hat performed an action, among others.

Aspects of this disclosure relate to generation and application of labels for data records. Such labels may be used for more efficient querying of data. Such labels may be defined by an administrative user of the data security system to meet the demands of the administrative user of the data security system for particular use cases. For example, an administrative user of the data security system may define the type of metadata (e.g., a particular character string, a date, a particular number) criteria for triggering generation of a label for data records having the type of metadata criteria. In some examples, the administrative user may define a function that may transform the type of metadata that satisfies the triggering criteria for a data record into a label to apply to the data record. In some examples, the administrative user may define a rule that indicates a label to apply to the data record(s) that satisfy the type of metadata. An administrative user of the data security system may subsequently query the database for records based on the labels applied to the data records in a consistent format expected by the administrative user.

Aspects of the disclosure are initially described in the context of a computing environment. Aspects of the disclosure are further illustrated by and described with reference to flow diagrams, UI views, process flows apparatus diagrams, system diagrams, and flowcharts that relate to labels for data security system asset management.

FIG. 1 illustrates an example of a computing environment 100 that supports common vulnerabilities and exposures scaling in accordance with various aspects of the present disclosure. The computing environment 100 includes one or more computing assets 105 (e.g., a computing asset 105-*a*, a computing asset 105-*b*, and a computing asset 105-*c*) that are monitored or protected by a data security system 110. Although shown as three computing assets 105, the data security system 110 may monitor any quantity of computing assets. The data security system 110 may communicate with the one or more computing assets 105 via communication links 115 (e.g., via a network connection). For example, the network may implement transfer control protocol and internet protocol (TCP/IP), such as the Internet, or may implement other network protocols. For example, the communication links 115 may include aspects of one or more wired networks (e.g., the Internet), one or more wireless networks (e.g., cellular networks), or any combination thereof. The communication links 115 may include aspects of one or more public networks or private networks, as well as secured or unsecured networks, or any combination thereof. The communication links 115 also may include any quantity of communications links and any quantity of hubs, bridges, routers, switches, ports or other physical or logical network components.

As described herein, a computing asset 105 may be any device, physical or virtual, capable of analyzing, storing, generating, and transmitting or receiving data. For example, a computing asset 105 may be a desktop computer, an access point, a personal digital assistant (PDA), a laptop computer, a tablet computer, a smartphone, a server, a collection of servers, a database, a data store, a virtual machine, or any combination thereof.

For example, a virtual machine may run various applications, such as a database server, an application server, or a web server. For example, a server may be used to host (e.g., create, manage) one or more virtual machines, and a computing system manager may manage a virtualized infrastructure within a computing system and perform management operations associated with the virtualized infrastructure. A computing system manager may manage the provisioning of virtual machines running within the virtualized infrastructure and provide an interface to a computing asset 105 interacting with the virtualized infrastructure. For example, the computing system manager may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of a disk of a computing system, the memory of a computing system, the processor of a computing system, the network interface of a computing system, the data storage device of a computing system, or any combination thereof in support of running the various applications. Storage resource that are virtualized may be accessed by applications as a virtual disk.

The data security system 110 may be implemented on one or more servers. The data security system 110 may include a data center 130 (e.g., one or more databases) that may include one or more servers. For example, a server may allow a client (e.g., a computing asset 105 or the data security system controller 125) to download information or files (e.g., executable, text, application, audio, image, or video files) from the server, to upload such information or files to the server, or to perform a search query related to particular information stored by the server. In general, a server may refer to one or more hardware devices that act as the host in a client-server relationship or a software process that shares a resource with or performs work for one or more clients The data center 130 may be used for data storage, management, and processing. The data center 130 may utilize multiple redundancies for security purposes. In some cases, the data stored at data center 130 may be backed up by copies of the data at a different data center (not pictured).

The data security system 110 may include a data security system controller 125, a label generation manager 135, a query manager 140, and a UI manager 170. The data security system controller 125 may manage operation of the data security system 110, including the data center 130, the label generation manager 135, the query manager 140, and the UI manager 170. Though illustrated as a separate entity within the data security system 110, the data security system controller 125 may in some cases be implemented (e.g., as a software application) by one or more of servers of the data center 130. Though illustrated as a separate entities, one or more of the label generation manager 135, the query manager 140, and the UI manager 170 may be implemented (e.g., as a software application) by the data security system controller 125.

In some examples, an administrative user of the data security system 110 may interact with the data security system 110 using a computing device 120. The computing device 120 may be a user device that may be used to input information to or receive information from the data security system 110. In some examples, the computing device 120 may be a computing asset 105 monitored by the data security system 110. A user of the computing device 120 may provide user inputs via the computing device 120, which may result in commands, data, or any combination thereof being communicated via the communication link 115 to the data security system 110. A user of a computing device 120 may, for example, use the computing device 120 to interact with one or more UIs (e.g., graphical user interfaces (GUIs)) to operate or otherwise interact with the data security system 110.

In some examples, the data security system 110, or aspects thereof, may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the data security system 110, or aspects thereof, for example, through Software-as-a-Service (SaaS) or Infrastructureas-a-Service (IaaS) services provided by the cloud environment. SaaS may refer to a software distribution model in which applications are hosted by a service provider and made available to one or more client devices over a network (e.g., to one or more computing assets 105 over the communication links 115). IaaS may refer to a service in which physical computing resources are used to instantiate one or more virtual machines, the resources of which are made available to one or more client devices over a network (e.g., to one or more computing assets 105 over the communication links 115) As described herein, the data security system 110 may provide data/information security services to the computing assets 105. For example, the computing assets 105 may be associated with one or more customers of the data security system 110. For example, the data security system 110 may store (e.g., in the data center 130), a listing of known malware. The data security system 110 may scan the computing assets 105 (e.g., periodically or on-demand) for malware based on the listing of known malware. As another example, the data security system 110 may monitor for suspicious activity (e.g., unauthorized access to a computing device by a user account or downloading of suspicious software such are viruses or other malware). For example, the data center may store user account information 190 which may indicate permissions for user accounts associated with an entity for computing assets 105 associated with the entity.

The data security system 110 may be responsible for hundreds or thousands of physical and virtual computing assets 105 across multiple networks that may collectively generate thousands or millions of data records 155 (e.g., data record 155-*a* through data record 155-*n*). For example, data records 155 may include incident reports for the detection of suspicious activity or malware. As another example, a data record 155 may include the addition of a computing asset to an organization or a network. As another example, a data record 155 may include information such as records of scans of computing assets (e.g., which may or may not reveal suspicious activity). As another example, a data record 155 may involve an action performed by the data security system 110, such as blocking the download of a virus or removal of a virus or malware from a computing asset. The data security system 110 may store data records 155 for monitored organizations (e.g., data records 155 generated in associated with monitoring computing assets 105) in a data records database 150. Given the quantity of data records 155 generated across a monitored system, an administrative user of the data security system 110 may search across thousands or millions of data records 155 to find a relevant data record 155. Data records 155 may include associated metadata 160, such strings that describe the data record (e.g., a computer-generated event string), date-time metadata fields, metadata fields that indicate a source computing asset (e.g., by device identifier, operating system, etc.), or metadata fields that indicate a user account hat performed an action, among others. For example, the data record 155-*a* may include associated metadata 160-*a*, and the data record 155-*n* may include associated metadata 160-*n*.

An administrative user may define rules or functions for generation of labels 165 that may be applied to the data records 155 and stored with the data records in the database. For example, the UI manager 170 may manage display at the computing device 120 of a UI which enables an administrative user to define rules or functions for generation of labels 165. For example, the administrative user may define, via the computing device 120, a function that indicates a type of metadata (e.g., metadata criteria) and a transformation to apply to the type of metadata. The type of metadata, for example, may be a metadata criteria which the data security system 110 (e.g., the label generation manager 135) may search for among the metadata 160 in the data records database 150. As another example, the administrative user may define, via the computing device 120, a rule that indicates a label 165 to apply to any data record that includes metadata 160 matching a metadata criteria. Label generation functions may be stored in a function listing 175 in the data center 130. Label generation rules may be stored in a rule listing 180 in the data center 130. Accordingly, the label generation manager 135 may query the data records 155 in the data records database 150 for data records 155 having metadata 160 that match the metadata criteria for the functions and/or rules provided by the administrative user (e.g., and stored in the function listing 180 and/or rule listing). The label generation manager 135 may generate labels 165 for data records 155 that include metadata 160 that matches the metadata criteria for the functions and/or rules. The label generation manager 135 may store the data records 155 with the corresponding generated labels 165 in the data records database 150. For example, the label generation manager 135 may generate and apply a label 165-*a* to the data record 155-*a* and the label generation manager 135 may generate and apply a label 165-*n* to the data record 155-*n*.

An administrative user may use the labels to search for relevant data records 155, for example, via a search UI that may be displayed on the computing device 120. For example, the UI manager 170 may manage display at the computing device 120 of a UI which enables an administrative user to search for and browse data records 155 based on attached labels 165. For example, the administrative user may provide a query that indicates one or more labels 165, and the query manager 140 may search the data records database 150 for data records 155 with the indicated one or more labels 165. The query manager 140 may retrieve the data records 155 with the indicated one or more labels, and the UI manager 170 may cause display at the computing device 120 of at least portions of the data records 155 with the indicated one or more labels 165. Accordingly, labels 165 may be defined and used to enable efficient search and display of data records associated with the data security system 110. For example, "read-only" queries that do not use generated labels and instead search for text in computer-generated data records may be unable to complete searches of data records 155 as completely as searches that use generated labels. In some examples, labels may be generated from pre-built rules and queries based on the data security system 110 (e.g., based on knowledge of Cyber Asset Attack Surface Management (CAASM)). In some examples, labels may be generated based on business rules provided by a customer of the data security system 110 (e.g., based on the domain knowledge and use cases of the customer).

For example, a rule-based label may define that if the name of a computing asset 105 starts with "Web" then the computing asset 105 may be defined as type "Web" (e.g., a label may be applied which indicates an asset type as "Web"). As another example, the rule-based label may define that if a computing asset 105 includes an operating system metadata field that includes the text "Windows," a label may be applied to the data record 155 for the computing asset 105 that indicates the operating system vendor as "Microsoft." Accordingly, an administrative user may search for data records that have an asset name label "Web" or an operating system vendor label "Microsoft."

The label generation manager 135 may include query criteria manager 185 and/or a value manager 195. The query criteria manager 185 may specify different rules to locate the interested data records. In some examples, rules defined first may have higher priorities in the event there is any conflict among these rules. For example, if there are two rules: Rule 1) If Asset Name match "^web"; and Rule 2) If Asset Name match "^webserver", and one data record 155 with Asset Name="webserver-1", this data record 155 satisfies both Rule 1 (Asset name starting with "web") and Rule 2 (Asset name starting with "webserver"). If Rule 1 is defined before Rule 2, Rule 1 may have a higher priority and may be applied to the data record 155. In some examples, the administrative user may define a priority level for a particular defined rule.

The value manager 195 may define how to transform and generate new data values. For example, the value manager 195 may define rule-based labels (e.g., If Asset Name match "^web", Then new value="Web"). As another example, the value manager 195 may define transformation functions to apply to metadata of data records 155.

Transformation functions may be more flexible that rule-based labels. For example, a dynamic transformation may be that: if Asset Name match "^web", Then new value =left (Asset_Name, 3). Examples of transformation functions may include math functions, text functions, list functions, date functions, or any custom functions.

For example, math functions may include divide functions, multiply functions, addition functions, or subtraction functions. For example, a divide function may be used to convert a memory size field in MB to GB (e.g., divide (memory_size, 1024)). As another example, a multiple function may be used to convert a memory size field in GB to MB (e.g., multiply(memory_size, 1024)). As another example, an addition function or a subtraction function may be used to add or decrease a value (e.g., a function to increase a server monthly cost field may be defined as: plus(monthly_cost, 50); a function to decrease a server monthly cost field may be defined as: minus(monthly_cost, 50)).

As described herein, text transformation functions may be defined and applied to data records 155. For example, a substring function may extract a substring from a longer string that matches string criteria. For example, some types of computing assets may have a particular name pattern, such as a name pattern AD-XXXXXX-1, and such assets may all have the exact XXXXXX (server name) in the middle where the server name always has 6 characters. In such examples, a substring function may be defined as substring(asset_name, 4, 10)="XXXXXX" to extract the server name "XXXXXX" from the name pattern AD-XXXXXX-1.

Another example text transformation function may be an upper function to make the text upper case. For example, a country ISO code may be transformed to be in upper case (e.g., using the function: upper(country_iso_code)). Another example text transformation function may be a lower function to make the text lower case. For example, a computing asset FQDN may be transformed to be in lower case (e.g., using the function: lower(FQDN)).

Another example text transformation function may be a replace function. For example, a replace function may be used to convert one country's name to its ISO code (e.g., United States" to "USA" using the function: (country_name, "United States", "USA")).

Another example text transformation function may be a left function. For example, some computing asset names may always start with "Web," indicating that they computing assets are web servers, and a "left" function may be used to extract the three leading characters "web" (e.g., using the function: left(asset_name, 3)="Web"). Another example text transformation function may be a right function. For example, some computing asset names may always end with "K8S," indicating that the computing assets are Kubernetes nodes. A "right" function may be used to extract the three ending characters "K8S" (e.g., using the function right (asset_name, 3)="K8S").

Another example text transformation function may be a regexfind function. For example, if a user name is an email address, the regexfind function may be used to extract the real user name before the "@". For example, for an email address abcdefg@hijk.com, the actual user name abcdefg may be extracted using the function: regexfind(user_name, "(.*?)@"). Another example text transformation function may be a split function. A split function may similarly be used to extract a user name from an email address but may also capture the domain name after the "@". For example, the function: split(user_name, "@", 1) applied to "abcdefg@hijk.com" may return "abcdefg.hijk"; and the function split(user_name, "@", 1) applied to "abcdefg@hijk.com" may return "abcdefg".

Another example text transformation function may be a trim function. For example, a trim function may be used to remove blanks or double quotes around a string such as an asset name. For example, a function: trim(asset_name, "") may remove quotation marks from a string.

As another example, list functions may be used to extract objects from a list. For example, the object_extract function may be used to extract a particular tag from a list of fields. For example, to extract an AWS Tag value when the Tag Key='Environment," e.g., Tag=[{'Key': 'Environment', 'Value': 'Production'}, {'Key': 'Name', 'Value': 'Test-Server'}], a function: object_extract(field='Tag', key_name='Key', key_value='Environment', output_key_name='Value') may output ['Production'].

As another example of a list function, a length function may be used to extract the quantity of MAC addresses for an asset (e.g., the function: length(mac_address) may be used to indicate the quantity of MAC addresses for a particular asset based on the quantity of MAC address fields). As another of a list function, an index function may be used to extract a particular value from a particular list (e.g., the function: index(ip_address, 0) may be used to extract the first IP address from a list of IP addresses).

As another example, datetime functions may be used. For example, a year function may be used to extract a year from a timestamp (e.g., a function: year(last_time_seen) may extract a year from a latest timestamp, such as "2021"). As another example, a month function may be used to extract a month from a timestamp (e.g., a function: month(last_time_seen) may extract a month from a latest timestamp, such as "12"). As another example, a week function may be used to extract a week from a timestamp (e.g., a function: week (last_time_seen) may extract a week from a latest timestamp, such as "50").

As another example, a day function may be used to extract a day from a timestamp (e.g., a function: day(last_time_seen) may extract a day from a latest timestamp, such as "364"). As another example, an elapse function may be used to find the difference between two times (e.g., such as the difference in days between the current date and the data an asset warranty expired, via the function: elapse_days(asset_warranty_time, now)).

In some examples, administrative users may define custom functions. For example, a custom function: function (name) {return hex_md5(file_name)=="15b0a220-baa16331e8d80e15367677ad"} may check whether an MD5 hash of a file name is equal to a specified hash value and may return a Boolean output (e.g., true or false).

Accordingly, the query criteria manager 185 may search for data records 155 matching criteria defined for application of a rule or function-based label, and the value manager 195 may apply a label based on defined function or rule to data records 155 that match the defined criteria. The query criteria manager 185 may identify whether data records 155 that are added to the data records database 150 after definition of the rule or function match the criteria for the application of a rule or function-based label. Accordingly, labels may be applied to data records which may be used for more efficient search and management of data records 155 in the data security system 110.

The query criteria manager 185 may also search for data records based on when changes are made to a label. For example, a timestamp may be stored each time a label is updated. If a label value A is set at date or time X, the timestamp associated with the setting of value A is stored (reference date or time X). Then, if the label value changes to value B at date or time Y, and then to value C at date or time Z, then corresponding timestamps are recorded reflecting the date or time that the label value changed. The query criteria manager 185 may then use the label change timestamps in its queries. For example, in one use case, the query criteria manager 185 could be used in connection with a query to find assets having the label value set to X or Y within the past seven days. As another example use case, the query criteria manager 185 could be used in connection with a query to find assets having the label value last set as X during the past three days.

It should be appreciated by a person skilled in the art that one or more aspects of the disclosure may be implemented in the computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
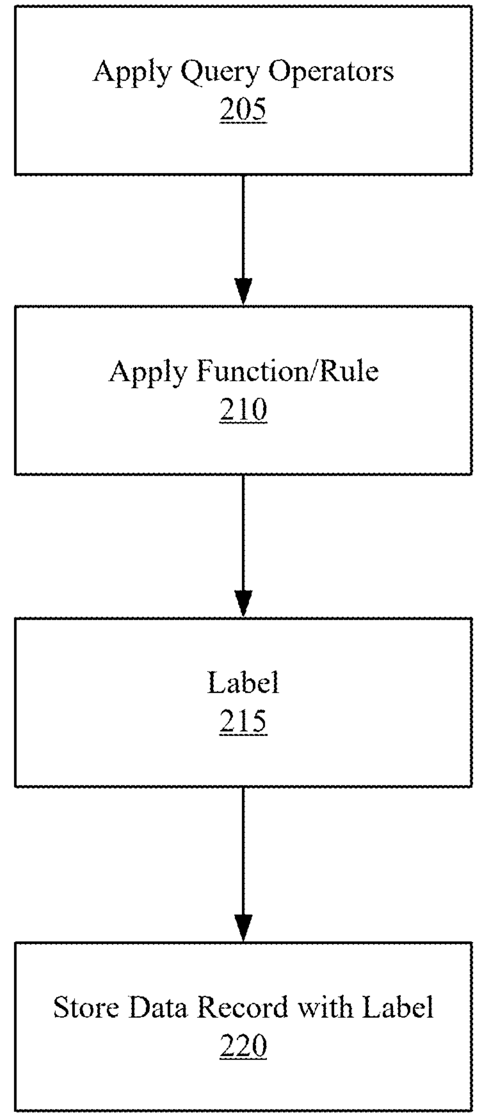
FIG. 2 shows an example of a flow diagram that supports labels for data security system asset management in accordance with aspects of the present disclosure.

FIG. 2 shows an example of a flow diagram 200 that supports labels for data security system asset management in accordance with aspects of the present disclosure. The flow diagram 200 may implement or may be implemented by aspects of the computing environment 100. For example, the flow diagram 200 may illustrate an example of a process that may be implemented by data security system 110 described with reference to FIG. 1. For example, the process illustrated by the flow diagram 200 may be implemented by the label generation manager 135 as described herein. For example, the flow diagram may illustrate a process for searching for data records 155 in the data records database 150 that include metadata that matches metadata criteria for generation of a rule or function-based label, and generating the label for the data records 155 that including the metadata that matches the metadata criteria.

At 205, the label generation manager 135 may apply query operators to data records 155 in the data records database 150 to search for data records 155 that include metadata that matches metadata criteria for generation of one or more rule or function-based labels. For example, criteria may be that the metadata matches a particular value (e.g., regex), is equal to a particular value, has an empty particular metadata field, or has an existing particular metadata field. For example, the metadata criteria may be that an asset name metadata field starts with the character string "web" which may indicate that the asset is a web server. Such an example may be: "Asset Name match "^web".

At 210, the label generation manager 135 may apply the rule or function to the data record 155. For a rule-based label. the label generation manager may add the label at 215. For example, for a rule that states that for assets with "Asset Name match "^web"; new value="Web," the label generation manager 135 may generate the label "Web" at 210 and may add the label the data record 155 at 215. For function-based label generation, the label generation manager 135 may apply the transformation function to the relevant metadata of the data record 155 at 210 to generate the label at 215. Example transformation functions may include regexfind, substring, left/right, or upper/lower functions. For example, a defined function may define a transformation as extracting the first three characters from the asset name metadata field. Such a transformation function may be defined as: "my_asset_function=left(asset_name, 3). At 215 the label generation manager 135 may apply the label generated at 210 to the data record 155.

At 220, the label generation manager 135 may store the data record 155 in the data records database 150 with the label applied at 215.

FIG. 3 shows an example of a UI view 300 and a UI view 305 that supports labels for data security system asset management in accordance with aspects of the present disclosure. The UI view 300 and the UI view 305 may implement or may be implemented by aspects of the computing environment 100 or the flow diagram 200. For example, the UI view 300 and/or the UI view 305 may be presented on a display of a computing device 120 as described herein.

For example, the UI view 300 may illustrate an example view of a UI that an administrative user of a data security system 110 may use to define metadata criteria 310 for application of a rule-based label as well as the rule-based label 315 to apply to data records 155 that match the defined metadata criteria 310. As shown, the administrative user may apply the rule-based label via application of a submit field 330. For example, once the administrative user applies the submit field 330, the data security system 110 may search the data records database 150 for data records 155 that match the metadata criteria 310 and may apply the rule-based label 315 defined in the UI view 300 to data records 155 that match the metadata criteria 310.

The UI view 305 may illustrate an example view of a UI that an administrative user of a data security system 110 may use to define metadata criteria 320 for application of a function-based label as well as the defined function 335 to apply to data records 155 that match the defined metadata criteria 320. As shown, the administrative user may apply the function-based label via application of a submit field 330. For example, once the administrative user applies the submit field 330, the data security system 110 may search the data records database 150 for data records 155 that match the metadata criteria 320 and may apply the defined function 325 to data records 155 that match the metadata criteria 320.

Figure 4:
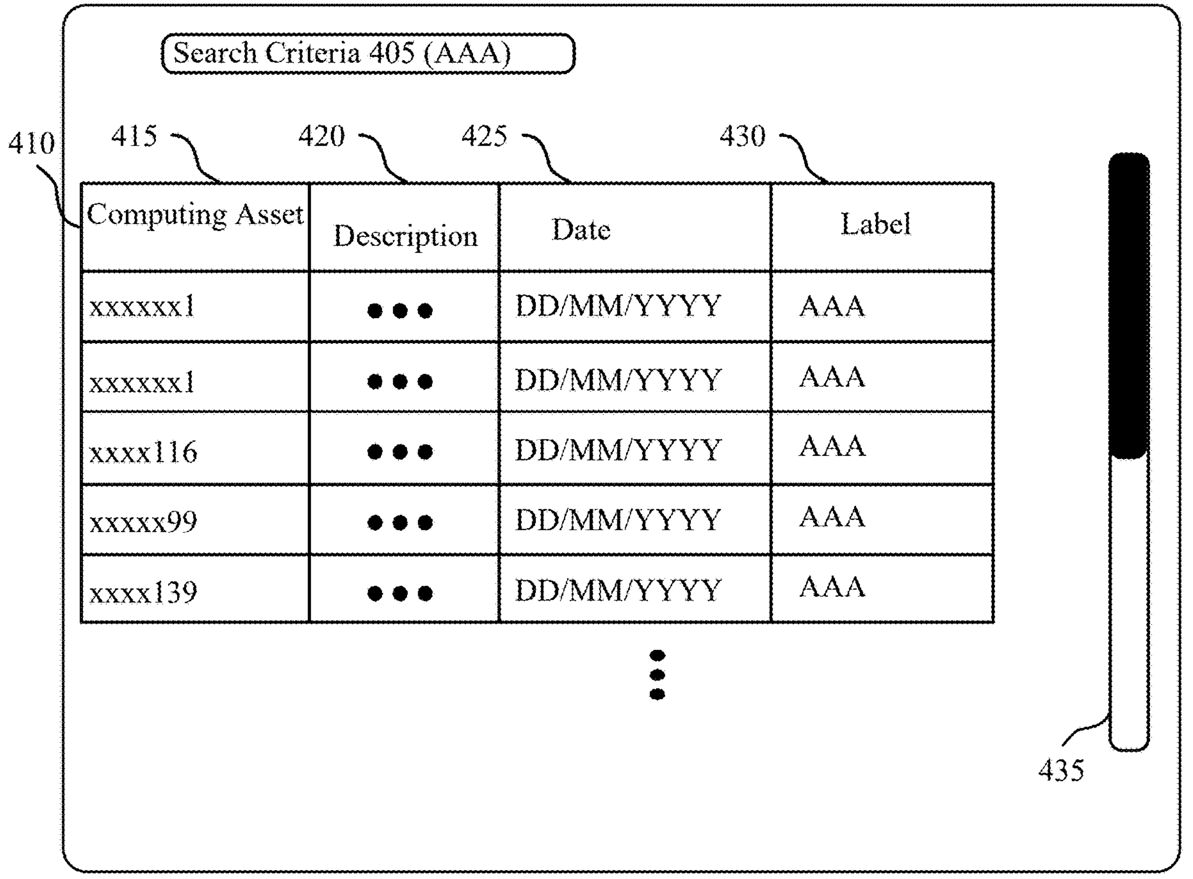
FIG. 4 shows an example of a UI view that supports labels for data security system asset management in accordance with aspects of the present disclosure.

FIG. 4 shows an example of a UI view 400 that supports labels for data security system asset management in accordance with aspects of the present disclosure. The UI view 400 may implement or may be implemented by aspects of the computing environment 100 or the flow diagram 200. For example, the UI view 400 may be presented on a display of a computing device 120 as described herein.

The UI view 400 shows a view of a result of a query for a particular label (e.g., shown as "AAA." For example, the UI view 400 may include a search criteria field 405 in which the user may input a label for which to search. In response to submission of the query via the search criteria field 405, the data security system 110 (e.g., the query manager 140) may search for data records 155 in the data records database 150 that include labels that match the requested labels in the search criteria field 405. In some examples, the administrative user may use Boolean logic to search for multiple labels (e.g., data records that include both of two labels, data records that have either of two labels, etc.).

The UI view 400 may display a table 410 of data records that match the search criteria submitted in the search criteria field 405. For example, the table 410 may include a computing asset column 415, a description column 420, a date column 425, and a label column 430. The computing asset column 415 may indicate the corresponding computing asset for the data record 155 (e.g., the computing asset 105 for which the data record 155 was generated or describes). The description column 420 may include the generated data record (e.g., the computer generated data record 155). The date column 425 may indicate a date and/or time that the data record 155 was generated or changed. The label column may indicate the label(s) which may match the search criteria field 405. The UI view 400 may include a scroll bar 435 to scroll through the data records 155 included in the table 410.

Figure 5:
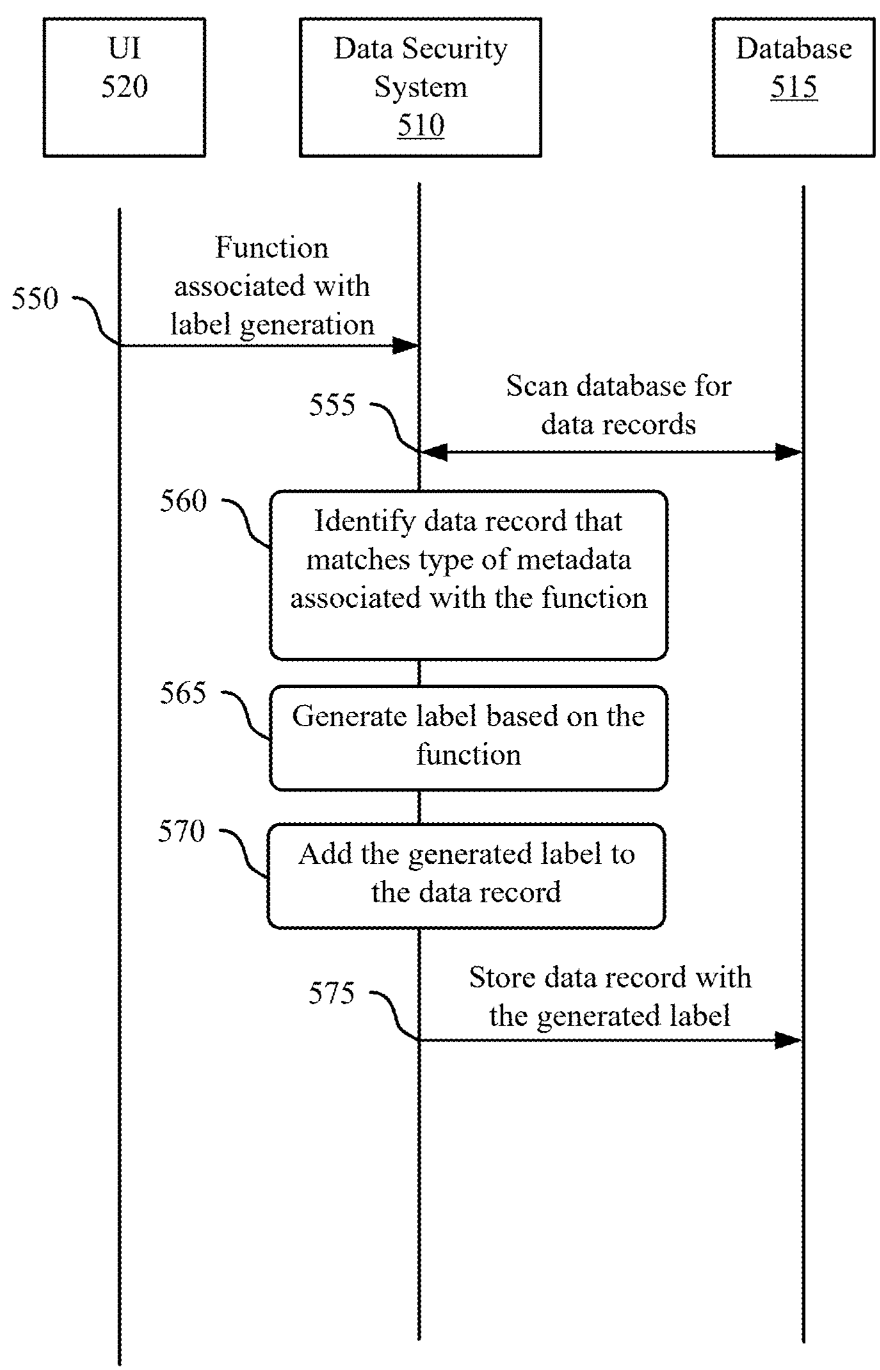
FIG. 5 shows an example of a process flow that supports labels for data security system asset management in accordance with aspects of the present disclosure.

FIG. 5 shows an example of a process flow 500 that supports labels for data security system asset management in accordance with aspects of the present disclosure. The process flow 500 may implement or may be implemented by one or more aspects of the computing environment 100, flow diagram 200, the UI view 300, or the UI view 400. For example, the process flow 500 may include a data security system 510, which may be an example of a data security system 110 as described herein. The process flow 500 may include a UI 520, which may be an example of a UI of a computing device 120 as described herein. The process flow 500 may include database 515, which may be an example of a data records database 150 as described herein. In the following description of the process flow 500, operations between the data security system 510, the UI 520, and the database 515 may be added, omitted, or performed in a different order (with respect to the exemplary order shown).

At 550, the data security system 510 may receive, via the UI 520, a function associated with label generation. The function may indicate a type of metadata and a transformation to apply to the type of metadata. The UI 520 may be associated with a client account of the data security system 510. For example, the UI 520 may be associated with an administrative account of the data security system 510 (e.g., for a particular customer or organization).

At 555, the data security system 510 may perform a scan of the database 515. The database 515 may store a set of multiple records associated with a set of multiple computing assets associated with the client account. The set of multiple records may include identifiers for the computing assets and metadata associated with the set of computing assets.

At 560, the data security system 510 may identify, based on the scan at 555, a data record of the set of multiple data records that includes metadata that matches the type of metadata. For example, the data security system 510 may identify that metadata of the data record matches metadata criteria indicated for application of the function.

At 565, the data security system 510 may generate a label based on application of the transformation to the metadata in accordance with the function.

At 570, the data security system 510 may add the label to the data record.

At 575, the data security system 510 may store the data record with the added label in the database 515.

In some examples, the data security system 510 may receive a second data record associated with a second computing asset associated with the client account for addition to the database 515. For example, the received second data record may be a newly added data record after reception of the function at 550. The second data record may include a second identifier and second metadata associated with the second computing asset. In such examples, the data security system 510 may identify that the second metadata matches the type of metadata. The data security system 510 may generate a second label based on application of the transformation to the second metadata in accordance with the function. The data security system 510 may add the second label to the second data record. The data security system 510 may store the second data record with the added second label in the database 515.

In some examples, the data security system 510 may identify, based on the scan at 555, a second data record of the set of multiple data records that includes second metadata that matches the type of metadata. The data security system 510 may generate a second label based on application of the transformation to the second metadata in accordance with the function. The data security system 510 may add the second label to the second data record.

The data security system 510 may store the second data record with the added second label in the database 515. For example, the data security system 510 may identify multiple data record which include metadata that matches the criteria for the same function, and accordingly, the data security system 510 may generate respective labels for the multiple data records in accordance with the same function.

In some examples, the data security system 510 may receive, via the UI 520 or a second UI associated with the client account (e.g., associated with a different administrative account), a second function associated with label generation. The second function may indicate a second type of metadata and a second transformation to apply to the second type of metadata. For example, clients of the data security system 510 may configure multiple functions to generate labels for data records. The data security system 510 may identify, based on the scan at 555 or a second scan, that the data record includes second metadata that matches the second type of metadata. For example, the data security system 510 may identify that metadata of the data record matches metadata criteria indicated for application of the second function. The data security system 510 may generate a second label based on application of the second transformation to the metadata in accordance with the function. The data security system 510 may add the second label to the data record. The data security system 510 may store the data record with the added second label in the database 515. For example, the same data record may include metadata that matches the criteria for multiple functions, and accordingly the data security system 510 may generate and add multiple labels to the same data record.

In some examples, the data security system 510 may receive, via the UI 520 or a second UI associated with the client account (e.g., associated with a different administrative account), a second function associated with label generation. The second function may indicate a second type of metadata and a second transformation to apply to the second type of metadata. The data security system 510 may identify, based on the scan at 555 or a second scan, that a second data record of the set of multiple data records includes second metadata that matches the second type of metadata. For example, the data security system 510 may identify that the second metadata of the second data record matches metadata criteria indicated for application of the second function. The data security system 510 may generate a second label based on application of the second transformation to the second metadata in accordance with the function. The data security system 510 may add the second label to the second data record. The data security system 510 may store the data record with the added second label in the database 515.

In some examples, the data security system 510 may receive, and via the UI 520 or a second UI associated with the client account, a query that indicates the label. The data security system 510 may retrieve, from the database 515 and based on the query, a set of data records that include the label, the set of data records including the data record. The data security system 510 may cause display of the set of data records at the UI 520 or the second UI. For example, labels may be used for retrieval and display of data records to administrative users of a client of the data security system 510.

In some examples, the data security system 510 may receive, and via the UI 520 or a second UI associated with the client account, a rule associated with label generation. The rule may indicate a metadata criteria and a second label. The data security system 510 may identify, based on the scan or a second scan, that the metadata or second metadata of the data record matches the metadata criteria. The data security system 510 may add the second label to the data record based on identifying that the metadata or the second metadata of the data record matches the metadata criteria. The data security system 510 may store the data record with the added second label in the database 515. For example, administrative users may define rule-based labels and functions for label generation, and the same data record may satisfy criteria for both application of a rule-based label and for generation of a label in accordance with a function. In some examples, the data security system 510 may receive, via the UI 520 or the second UI, a second rule associated with label generation, where the rule indicates a second metadata criteria and a third label, where the second metadata criteria overlaps at least in part with the metadata criteria, and where the second rule has a lower priority than the rule. The data security system 510 may identify, based on the scan or the second scan, that the metadata or the second metadata of the data record matches the metadata criteria. The data security system 510 may refrain from adding the third label to the data record based on adding the second label to the data record and based on the second rule having a lower priority than the rule. In some examples, the data security system 510 may identify, based on the scan or the second scan, a second data record of set of multiple data records that includes second metadata that matches the second metadata criteria. The data security system 510 may identify, based on the scan or the second scan, that the second metadata does not match the metadata criteria. The data security system 510 may add the third label to the second data record based on identifying that the second metadata of the data record matches the second metadata criteria and that the second metadata does not match the metadata criteria (e.g., that there is no conflict with a higher priority rule). The data security system 510 may store the second data record with the added third label in the database 515. For example, the data security system 510 may add a lower priority label if the lower priority label does not overlap for a particular data record with a higher priority label. In some examples, the data security system 510 may receive, via the UI 520 the second UI, or a third UI associated with the client account, a query that indicates the second label. The data security system 510 may retrieve, from the database and based on the query, a set of data records that include the second label, the set of data records including the data record. The data security system 510 may cause display of the set of data records at the UI 520, the second UI, or the third UI.

In some examples, the data security system 510 may receive, via the UI 520 or a second UI associated with the client account, rule associated with label generation. The rule may indicate a metadata criteria and a second label. The data security system 510 may identify, based on the scan or a second scan, a second data record of the set of multiple data records that includes second metadata that matches the metadata criteria. The data security system 510 may add the second label to the second data record based on identifying that the second metadata of the second data record matches the metadata criteria. The data security system 510 may store the second data record with the added second label in the database 515.

In some examples, the transformation may be a mathematical operation, and the type of metadata may be a numeral and a unit. In some examples, the transformation may be a text transformation, and the type of metadata may be a string type (e.g., a particular set of characters). In some examples, the transformation may be a list function, and the type of metadata may be a list type. In some examples, the transformation may be a date operation, and the type of metadata may be a date field.

Figure 6:
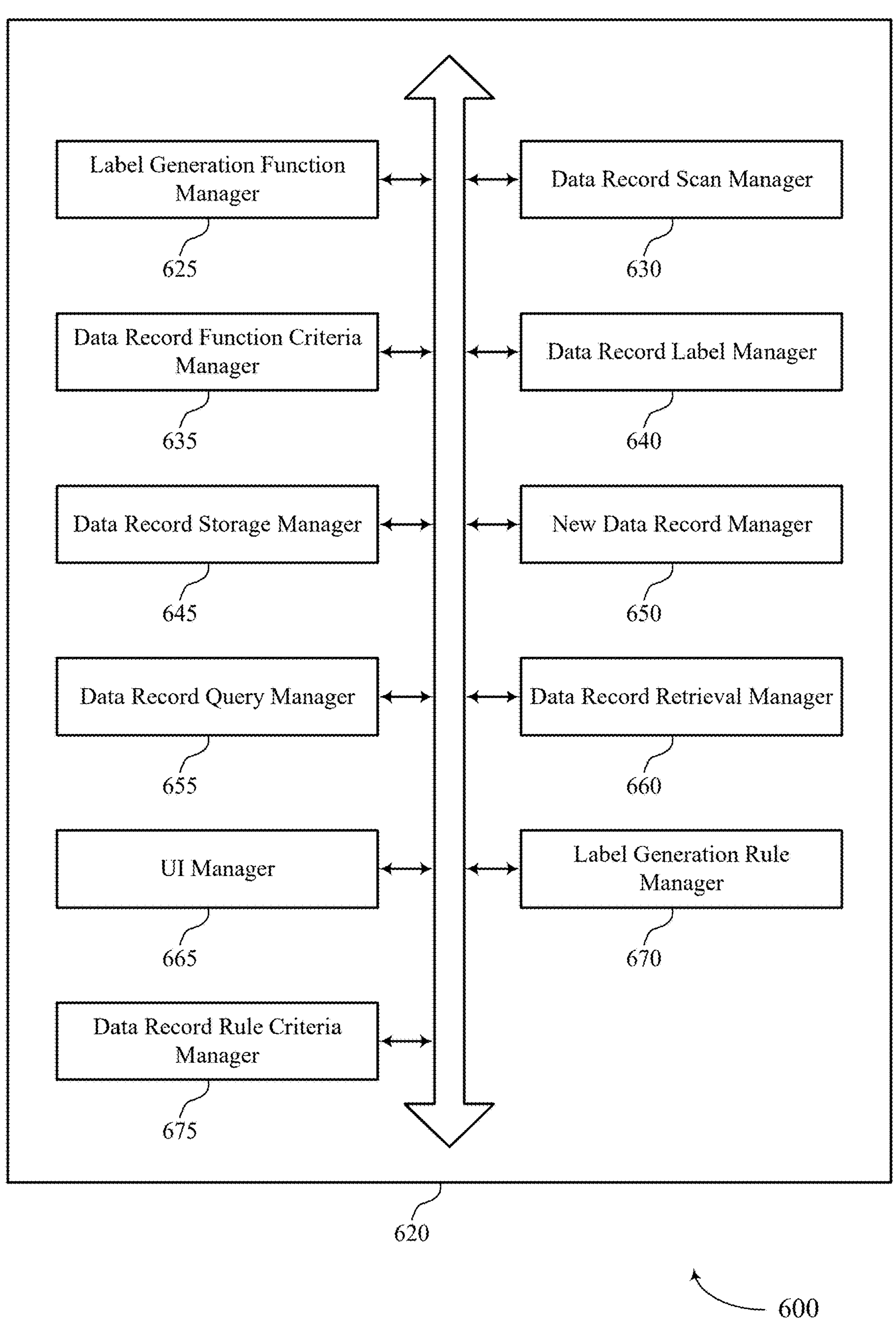
FIG. 6 shows a block diagram of a data security system controller that supports labels for data security system asset management in accordance with aspects of the present disclosure.

FIG. 6 shows a block diagram 600 of a data security system 620 that supports labels for data security system asset management in accordance with aspects of the present disclosure. The data security system 620 may be an example of aspects of a data security system as described with reference to FIGS. 1 through 5. The data security system 620, or various components thereof, may be an example of means for performing various aspects of labels for data security system asset management as described herein. For example, the data security system 620 may include a label generation function manager 625, a data record scan manager 630, a data record function criteria manager 635, a data record label manager 640, a data record storage manager 645, a new data record manager 650, a data record query manager 655, a data record retrieval manager 660, a UI manager 665, a label generation rule manager 670, a data record rule criteria manager 675, or any combination thereof. Each of these components, or components of subcomponents thereof (e.g., one or more processors, one or more memories), may communicate, directly or indirectly, with one another (e.g., via one or more buses). In some examples, one or more components of the data security system 620 may be implemented across one or more distributed servers or as cloud applications and may communicate with each other over network connections (e.g., via communications links 115 as described herein).

The label generation function manager 625 may be configured to support receiving, by a data security system and via a UI associated with a client account of the data security system, a function associated with label generation, where the function indicates a type of metadata and a transformation to apply to the type of metadata. The data record scan manager 630 may be configured to support performing, by the data security system, a scan of a database that stores a set of multiple data records associated with a respective set of multiple computing assets associated with the client account, the set of multiple data records including identifiers for the respective set of multiple computing assets and metadata associated with the respective set of multiple computing assets. The data record function criteria manager 635 may be configured to support identifying, by the data security system and based on the scan, a data record of the set of multiple data records that includes metadata that matches the type of metadata. In some examples, the label generation function manager 625 may be configured to support generating, by the data security system, a label based on application of the transformation to the metadata in accordance with the function. The data record label manager 640 may be configured to support adding, by the data security system, the label to the data record. The data record storage manager 645 may be configured to support storing, by the data security system, the data record with the label in the database.

In some examples, the new data record manager 650 may be configured to support receiving, by the data security system, a second data record associated with a second computing asset associated with the client account for addition to the database, the second data record including a second identifier and second metadata associated with the second computing asset. In some examples, the data record function criteria manager 635 may be configured to support identifying, by the data security system, that the second metadata matches the type of metadata. In some examples, the label generation function manager 625 may be configured to support generating, by the data security system, a second label based on application of the transformation to the second metadata in accordance with the function. In some examples, the data record label manager 640 may be configured to support adding, by the data security system, the second label to the second data record. In some examples, the data record storage manager 645 may be configured to support storing, by the data security system, the second data record with the second label in the database.

In some examples, the data record function criteria manager 635 may be configured to support identifying, by the data security system and based on the scan, a second data record of the set of multiple data records that includes second metadata that matches the type of metadata. In some examples, the label generation function manager 625 may be configured to support generating, by the data security system, a second label based on application of the transformation to the second metadata in accordance with the function. In some examples, the data record label manager 640 may be configured to support adding, by the data security system, the second label to the second data record. In some examples, the data record storage manager 645 may be configured to support storing, by the data security system, the second data record with the label in the database.

In some examples, the label generation function manager 625 may be configured to support receiving, by the data security system and via the UI or a second UI associated with the client account, a second function associated with label generation, where the second function indicates a second type of metadata and a second transformation to apply to the second type of metadata. In some examples, the data record function criteria manager 635 may be configured to support identifying, by the data security system and based on the scan, that the data record includes second metadata that matches the second type of metadata. In some examples, the label generation function manager 625 may be configured to support generating, by the data security system, a second label based on application of the second transformation to the second metadata in accordance with the function. In some examples, the data record label manager 640 may be configured to support adding, by the data security system, the second label to the data record. In some examples, the data record storage manager 645 may be configured to support storing, by the data security system, the data record with the second label in the database.

In some examples, the label generation function manager 625 may be configured to support receiving, by the data security system and via the UI or a second UI associated with the client account, a second function associated with label generation, where the second function indicates a second type of metadata and a second transformation to apply to the second type of metadata. In some examples, the data record function criteria manager 635 may be configured to support identifying, by the data security system and based on the scan, that a second data record of the set of multiple data records includes second metadata that matches the second type of metadata. In some examples, the label generation function manager 625 may be configured to support generating, by the data security system, a second label based on application of the second transformation to the second metadata in accordance with the function. In some examples, the data record label manager 640 may be configured to support adding, by the data security system, the second label to the second data record. In some examples, the data record storage manager 645 may be configured to support storing, by the data security system, the second data record with the second label in the database.

In some examples, the data record query manager 655 may be configured to support receiving, by the data security system and via the UI or a second UI associated with the client account, a query that indicates the label. In some examples, the data record retrieval manager 660 may be configured to support retrieving, from the database and based on the query, a set of data records that include the label, the set of data records including the data record. In some examples, the UI manager 665 may be configured to support causing, by the data security system, display of the set of data records at the UI or the second UI.

In some examples, the label generation rule manager 670 may be configured to support receiving, by the data security system and via the UI or a second UI associated with the client account, a rule associated with label generation, where the rule indicates a metadata criteria and a second label. In some examples, the data record rule criteria manager 675 may be configured to support identifying, by the data security system and based on the scan, that the metadata or second metadata of the data record matches the metadata criteria. In some examples, the data record label manager 640 may be configured to support adding, by the data security system, the second label to the data record based on identifying that the metadata or the second metadata of the data record matches the metadata criteria. In some examples, the data record storage manager 645 may be configured to support storing, by the data security system, the data record with the second label in the database.

In some examples, the label generation rule manager 670 may be configured to support receiving, by the data security system and via the UI or a second UI associated with the client account, a second rule associated with label generation, where the rule indicates a second metadata criteria and a third label, where the second metadata criteria overlaps at least in part with the metadata criteria, where the second rule has a lower priority than the rule. In some examples, the data record rule criteria manager 675 may be configured to support identifying, by the data security system and based on the scan, that the metadata or the second metadata of the data record matches the metadata criteria. In some examples, the label generation rule manager 670 may be configured to support refraining from adding the third label to the data record based on adding the second label to the data record and based on the second rule having a lower priority than the rule.

In some examples, the label generation rule manager 670 may be configured to support identifying, by the data security system and based on the scan, a second data record of the set of multiple data records that includes second metadata that matches the second metadata criteria. In some examples, the data record rule criteria manager 675 may be configured to support identifying, by the data security system and based on the scan, that the second metadata does not match the metadata criteria. In some examples, the data record label manager 640 may be configured to support adding, by the data security system, the third label to the second data record based on identifying that the second metadata of the data record matches the second metadata criteria and that the second metadata does not match the metadata criteria. In some examples, the data record storage manager 645 may be configured to support storing, by the data security system, the second data record with the third label in the database.

In some examples, the data record query manager 655 may be configured to support receiving, by the data security system and via the UI, the second UI, or a third UI associated with the client account, a query that indicates the second label. In some examples, the data record retrieval manager 660 may be configured to support retrieving, from the database and based on the query, a set of data records that include the second label, the set of data records including the data record. In some examples, the UI manager 665 may be configured to support causing, by the data security system, display of the set of data records at the UI, the second UI, or the third UI.

In some examples, the label generation rule manager 670 may be configured to support receiving, by the data security system and via the UI or a second UI associated with the client account, a rule associated with label generation, where the rule indicates a metadata criteria and a second label. In some examples, the data record rule criteria manager 675 may be configured to support identifying, by the data security system and based on the scan, a second data record of the set of multiple data records that includes second metadata that matches the metadata criteria. In some examples, the data record label manager 640 may be configured to support adding, by the data security system, the second label to the second data record based on identifying that the second metadata matches the metadata criteria. In some examples, the data record storage manager 645 may be configured to support storing, by the data security system, the second data record with the second label in the database.

In some examples, the transformation includes a mathematical operation. In some examples, the type of metadata includes a numeral and a unit.

In some examples, the transformation includes a text transformation. In some examples, the type of metadata includes a string type.

In some examples, the transformation includes a list function. In some examples, the type of metadata includes a list type.

In some examples, the transformation includes a date operation. In some examples, the type of metadata includes a date field.

Figure 7:
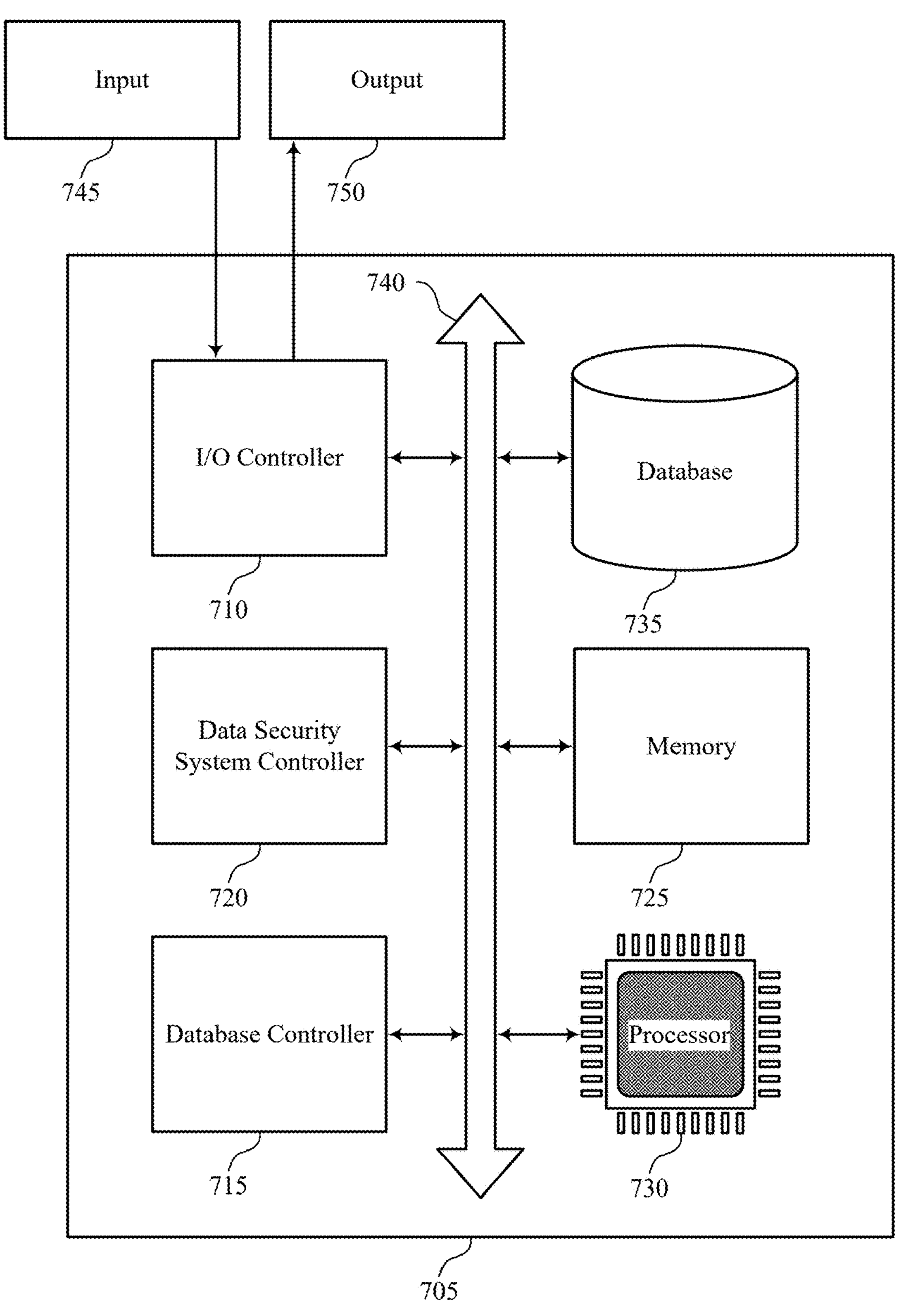
FIG. 7 shows a diagram of a system including a device that supports labels for data security system asset management in accordance with aspects of the present disclosure.

FIG. 7 shows a diagram of a system 700 including a device 705 that supports labels for data security system asset management in accordance with aspects of the present disclosure. The device 705 may include components for bi-directional data communications including components for transmitting and receiving communications, such as the data security system controller 720, an input/output (I/O) controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting labels for data security system asset management). The processor 730 may be an example of a single processor or multiple processors. For example, the device 705 may include one or more processors 730.

For example, the data security system controller 720 may be configured to support receiving, by a data security system and via a UI associated with a client account of the data security system, a function associated with label generation, where the function indicates a type of metadata and a transformation to apply to the type of metadata. The data security system controller 720 may be configured to support performing, by the data security system, a scan of a database that stores a set of multiple data records associated with a respective set of multiple computing assets associated with the client account, the set of multiple data records including identifiers for the respective set of multiple computing assets and metadata associated with the respective set of multiple computing assets. The data security system controller 720 may be configured to support identifying, by the data security system and based on the scan, a data record of the set of multiple data records that includes metadata that matches the type of metadata. The data security system controller 720 may be configured to support generating, by the data security system, a label based on application of the transformation to the metadata in accordance with the function. The data security system controller 720 may be configured to support adding, by the data security system, the label to the data record. The data security system controller 720 may be configured to support storing, by the data security system, the data record with the label in the database.

By including or configuring the data security system controller 720 in accordance with examples as described herein, the device 705 may support techniques for improved searching and management of data records.

Figure 8:
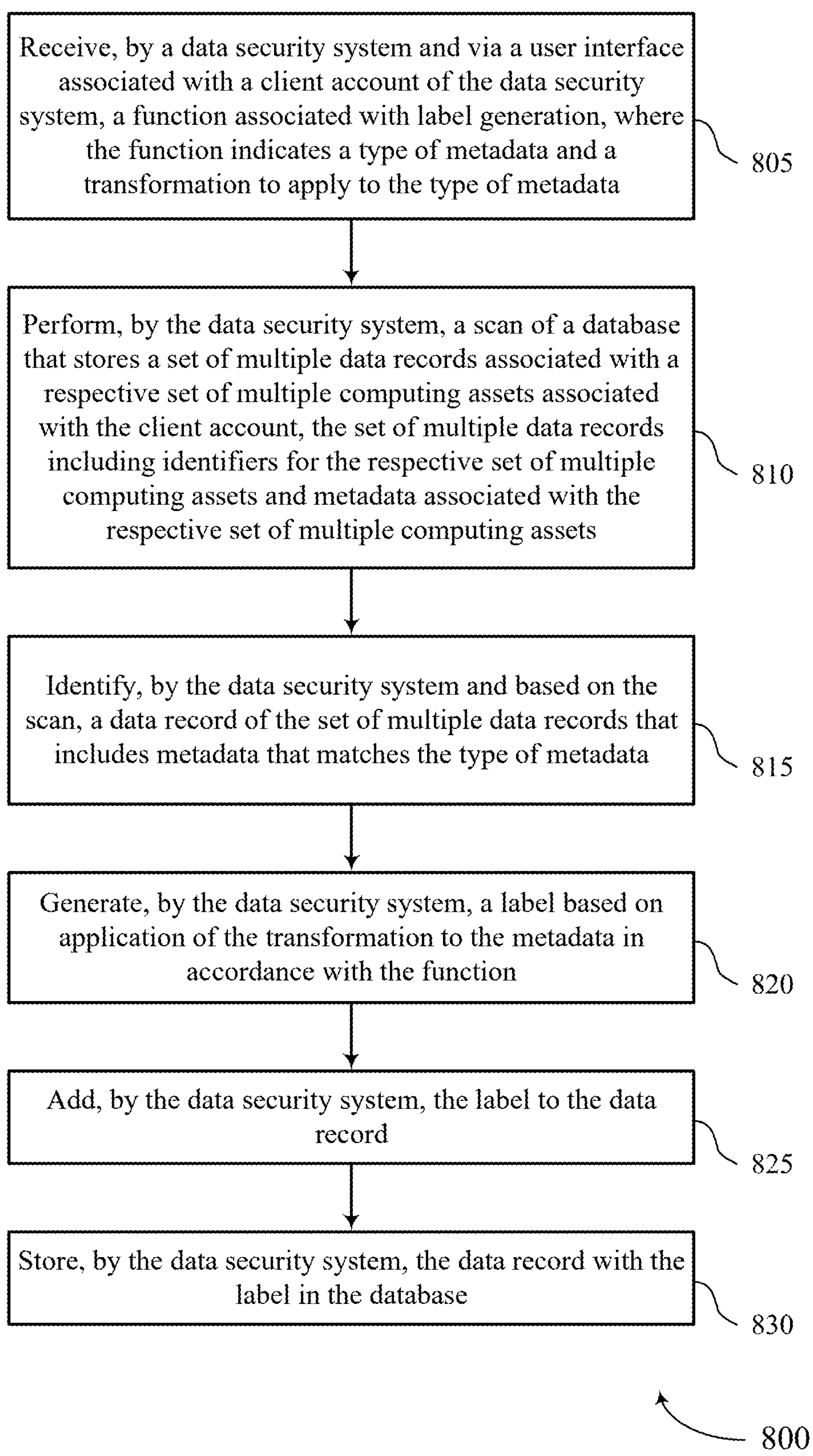
FIGS. 8 through 10 show flowcharts illustrating methods that support labels for data security system asset management in accordance with aspects of the present disclosure.

FIG. 8 shows a flowchart illustrating a method 800 that supports labels for data security system asset management in accordance with aspects of the present disclosure. The operations of the method 800 may be implemented by a data security system or its components as described herein. For example, the operations of the method 800 may be performed by a data security system as described with reference to FIGS. 1 through 7. In some examples, a data security system may execute a set of instructions to control the functional elements of the data security system to perform the described functions.

Additionally, or alternatively, the data security system may perform aspects of the described functions using special-purpose hardware.

At 805, the method may include receiving, by a data security system and via a UI associated with a client account of the data security system, a function associated with label generation, where the function indicates a type of metadata and a transformation to apply to the type of metadata. The operations of 805 may be performed in accordance with examples as disclosed herein. In some examples, aspects of the operations of 805 may be performed by a label generation function manager 625 as described with reference to FIG. 6.

At 810, the method may include performing, by the data security system, a scan of a database that stores a set of multiple data records associated with a respective set of multiple computing assets associated with the client account, the set of multiple data records including identifiers for the respective set of multiple computing assets and metadata associated with the respective set of multiple computing assets. The operations of 810 may be performed in accordance with examples as disclosed herein. In some examples, aspects of the operations of 810 may be performed by a data record scan manager 630 as described with reference to FIG. 6.

At 815, the method may include identifying, by the data security system and based on the scan, a data record of the set of multiple data records that includes metadata that matches the type of metadata. The operations of 815 may be performed in accordance with examples as disclosed herein. In some examples, aspects of the operations of 815 may be performed by a data record function criteria manager 635 as described with reference to FIG. 6.

At 820, the method may include generating, by the data security system, a label based on application of the transformation to the metadata in accordance with the function. The operations of 820 may be performed in accordance with examples as disclosed herein. In some examples, aspects of the operations of 820 may be performed by a label generation function manager 625 as described with reference to FIG. 6.

At 825, the method may include adding, by the data security system, the label to the data record. The operations of 825 may be performed in accordance with examples as disclosed herein. In some examples, aspects of the operations of 825 may be performed by a data record label manager 640 as described with reference to FIG. 6.

At 830, the method may include storing, by the data security system, the data record with the label in the database. The operations of 830 may be performed in accordance with examples as disclosed herein. In some examples, aspects of the operations of 830 may be performed by a data record storage manager 645 as described with reference to FIG. 6.

Figure 9:
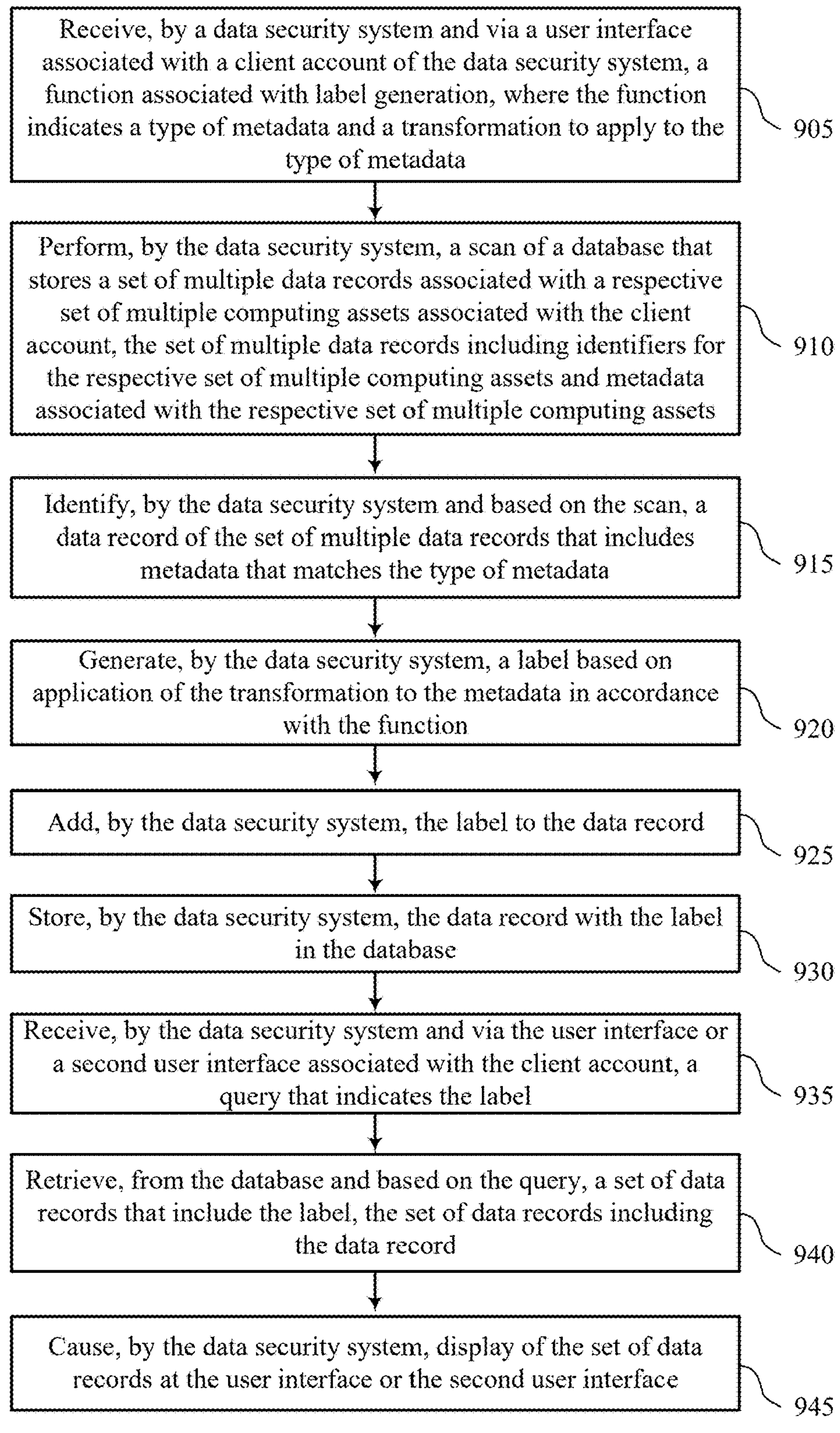

FIG. 9 shows a flowchart illustrating a method 900 that supports labels for data security system asset management in accordance with aspects of the present disclosure. The operations of the method 900 may be implemented by a data security system or its components as described herein. For example, the operations of the method 900 may be performed by a data security system as described with reference to FIGS. 1 through 7. In some examples, a data security system may execute a set of instructions to control the functional elements of the data security system to perform the described functions.

Additionally, or alternatively, the data security system may perform aspects of the described functions using special-purpose hardware.

At 905, the method may include receiving, by a data security system and via a UI associated with a client account of the data security system, a function associated with label generation, where the function indicates a type of metadata and a transformation to apply to the type of metadata. The operations of 905 may be performed in accordance with examples as disclosed herein. In some examples, aspects of the operations of 905 may be performed by a label generation function manager 625 as described with reference to FIG. 6.

At 910, the method may include performing, by the data security system, a scan of a database that stores a set of multiple data records associated with a respective set of multiple computing assets associated with the client account, the set of multiple data records including identifiers for the respective set of multiple computing assets and metadata associated with the respective set of multiple computing assets. The operations of 910 may be performed in accordance with examples as disclosed herein. In some examples, aspects of the operations of 910 may be performed by a data record scan manager 630 as described with reference to FIG. 6.

At 915, the method may include identifying, by the data security system and based on the scan, a data record of the set of multiple data records that includes metadata that matches the type of metadata. The operations of 915 may be performed in accordance with examples as disclosed herein. In some examples, aspects of the operations of 915 may be performed by a data record function criteria manager 635 as described with reference to FIG. 6.

At 920, the method may include generating, by the data security system, a label based on application of the transformation to the metadata in accordance with the function.

The operations of 920 may be performed in accordance with examples as disclosed herein. In some examples, aspects of the operations of 920 may be performed by a label generation function manager 625 as described with reference to FIG. 6.

At 925, the method may include adding, by the data security system, the label to the data record. The operations of 925 may be performed in accordance with examples as disclosed herein. In some examples, aspects of the operations of 925 may be performed by a data record label manager 640 as described with reference to FIG. 6.

At 930, the method may include storing, by the data security system, the data record with the label in the database. The operations of 930 may be performed in accordance with examples as disclosed herein. In some examples, aspects of the operations of 930 may be performed by a data record storage manager 645 as described with reference to FIG. 6.

At 935, the method may include receiving, by the data security system and via the UI or a second UI associated with the client account, a query that indicates the label. The operations of 935 may be performed in accordance with examples as disclosed herein. In some examples, aspects of the operations of 935 may be performed by a data record query manager 655 as described with reference to FIG. 6.

At 940, the method may include retrieving, from the database and based on the query, a set of data records that include the label, the set of data records including the data record. The operations of 940 may be performed in accordance with examples as disclosed herein. In some examples, aspects of the operations of 940 may be performed by a data record retrieval manager 660 as described with reference to FIG. 6.

At 945, the method may include causing, by the data security system, display of the set of data records at the UI or the second UI. The operations of 945 may be performed in accordance with examples as disclosed herein. In some examples, aspects of the operations of 945 may be performed by a UI manager 665 as described with reference to FIG. 6.

Figure 10:
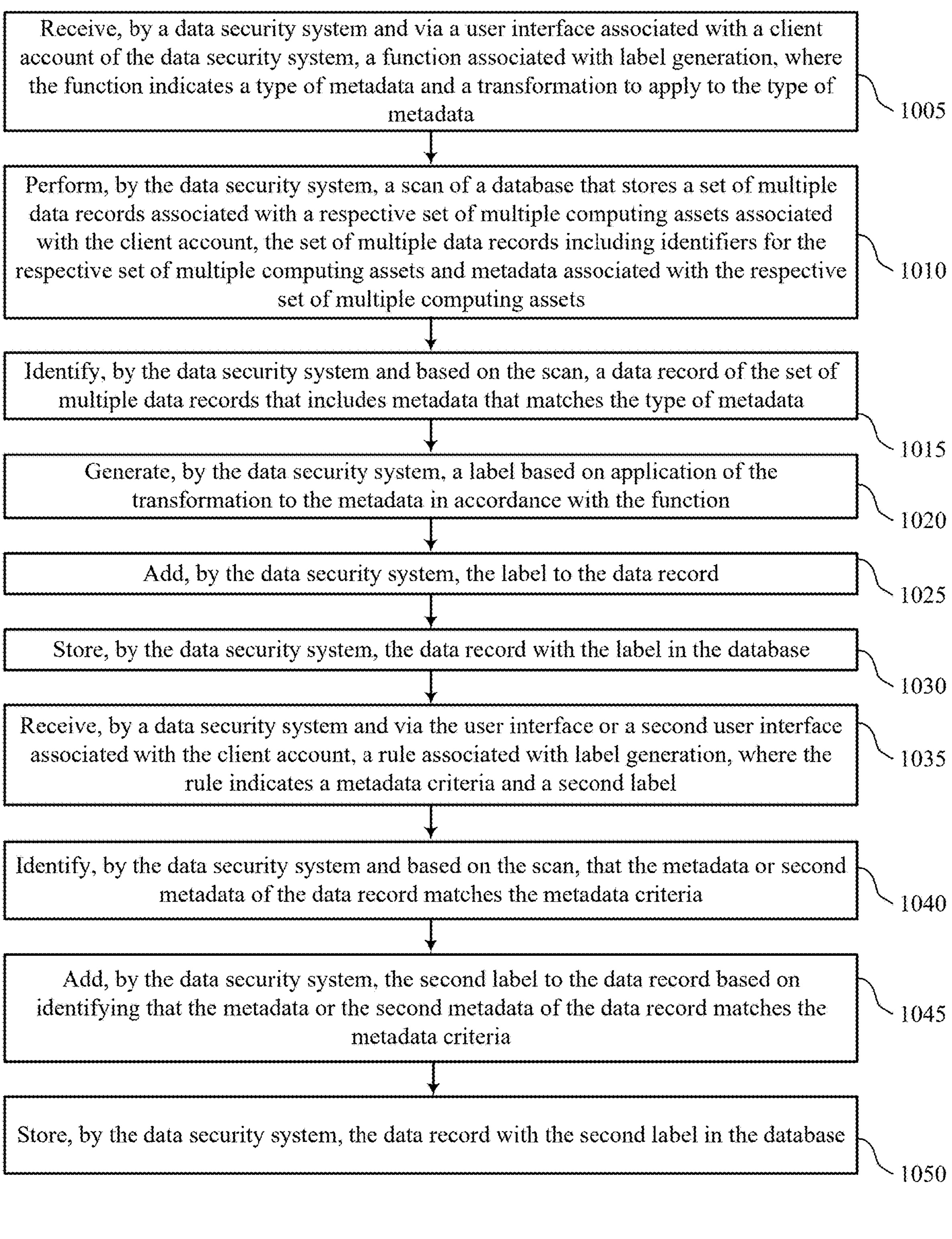

FIG. 10 shows a flowchart illustrating a method 1000 that supports labels for data security system asset management in accordance with aspects of the present disclosure. The operations of the method 1000 may be implemented by a data security system or its components as described herein. For example, the operations of the method 1000 may be performed by a data security system as described with reference to FIGS. 1 through 7. In some examples, a data security system may execute a set of instructions to control the functional elements of the data security system to perform the described functions.

Additionally, or alternatively, the data security system may perform aspects of the described functions using special-purpose hardware.

At 1005, the method may include receiving, by a data security system and via a UI associated with a client account of the data security system, a function associated with label generation, where the function indicates a type of metadata and a transformation to apply to the type of metadata. The operations of 1005 may be performed in accordance with examples as disclosed herein. In some examples, aspects of the operations of 1005 may be performed by a label generation function manager 625 as described with reference to FIG. 6.

At 1010, the method may include performing, by the data security system, a scan of a database that stores a set of multiple data records associated with a respective set of multiple computing assets associated with the client account, the set of multiple data records including identifiers for the respective set of multiple computing assets and metadata associated with the respective set of multiple computing assets. The operations of 1010 may be performed in accordance with examples as disclosed herein. In some examples, aspects of the operations of 1010 may be performed by a data record scan manager 630 as described with reference to FIG. 6.

At 1015, the method may include identifying, by the data security system and based on the scan, a data record of the set of multiple data records that includes metadata that matches the type of metadata. The operations of 1015 may be performed in accordance with examples as disclosed herein. In some examples, aspects of the operations of 1015 may be performed by a data record function criteria manager 635 as described with reference to FIG. 6.

At 1020, the method may include generating, by the data security system, a label based on application of the transformation to the metadata in accordance with the function.

The operations of 1020 may be performed in accordance with examples as disclosed herein. In some examples, aspects of the operations of 1020 may be performed by a label generation function manager 625 as described with reference to FIG. 6.

At 1025, the method may include adding, by the data security system, the label to the data record. The operations of 1025 may be performed in accordance with examples as disclosed herein. In some examples, aspects of the operations of 1025 may be performed by a data record label manager 640 as described with reference to FIG. 6.

At 1030, the method may include storing, by the data security system, the data record with the label in the database. The operations of 1030 may be performed in accordance with examples as disclosed herein. In some examples, aspects of the operations of 1030 may be performed by a data record storage manager 645 as described with reference to FIG. 6.

At 1035, the method may include receiving, by the data security system and via the UI or a second UI associated with the client account, a rule associated with label generation, where the rule indicates a metadata criteria and a second label. The operations of 1035 may be performed in accordance with examples as disclosed herein. In some examples, aspects of the operations of 1035 may be performed by a label generation rule manager 670 as described with reference to FIG. 6.

At 1040, the method may include identifying, by the data security system and based on the scan, that the metadata or second metadata of the data record matches the metadata criteria. The operations of 1040 may be performed in accordance with examples as disclosed herein. In some examples, aspects of the operations of 1040 may be performed by a data record rule criteria manager 675 as described with reference to FIG. 6.

At 1045, the method may include adding, by the data security system, the second label to the data record based on identifying that the metadata or the second metadata of the data record matches the metadata criteria. The operations of 1045 may be performed in accordance with examples as disclosed herein. In some examples, aspects of the operations of 1045 may be performed by a data record label manager 640 as described with reference to FIG. 6.

At 1050, the method may include storing, by the data security system, the data record with the second label in the database. The operations of 1050 may be performed in accordance with examples as disclosed herein. In some examples, aspects of the operations of 1050 may be performed by a data record storage manager 645 as described with reference to FIG. 6.

The following provides an overview of aspects of the present disclosure:

Aspect 1: A method, comprising: receiving, by a data security system and via a UI associated with a client account of the data security system, a function associated with label generation, wherein the function indicates a type of metadata and a transformation to apply to the type of metadata; performing, by the data security system, a scan of a database that stores a plurality of data records associated with a respective plurality of computing assets associated with the client account, the plurality of data records comprising identifiers for the respective plurality of computing assets and metadata associated with the respective plurality of computing assets; identifying, by the data security system and based on the scan, a data record of the plurality of data records that includes metadata that matches the type of metadata; generating, by the data security system, a label based on application of the transformation to the metadata in accordance with the function; adding, by the data security system, the label to the data record; and storing, by the data security system, the data record with the label in the database.

Aspect 2: The method of aspect 1, further comprising: receiving, by the data security system, a second data record associated with a second computing asset associated with the client account for addition to the database, the second data record comprising a second identifier and second metadata associated with the second computing asset; identifying, by the data security system, that the second metadata matches the type of metadata; generating, by the data security system, a second label based on application of the transformation to the second metadata in accordance with the function; adding, by the data security system, the second label to the second data record; and storing, by the data security system, the second data record with the second label in the database.

Aspect 3: The method of any of aspects 1 through 2, further comprising: identifying, by the data security system and based on the scan, a second data record of the plurality of data records that includes second metadata that matches the type of metadata; generating, by the data security system, a second label based on application of the transformation to the second metadata in accordance with the function; adding, by the data security system, the second label to the second data record; and storing, by the data security system, the second data record with the label in the database.

Aspect 4: The method of any of aspects 1 through 3, further comprising: receiving, by the data security system and via the UI or a second UI associated with the client account, a second function associated with label generation, wherein the second function indicates a second type of metadata and a second transformation to apply to the second type of metadata; identifying, by the data security system and based on the scan, that the data record includes second metadata that matches the second type of metadata; generating, by the data security system, a second label based on application of the second transformation to the second metadata in accordance with the function; adding, by the data security system, the second label to the data record; and storing, by the data security system, the data record with the second label in the database.

Aspect 5: The method of any of aspects 1 through 4, further comprising: receiving, by the data security system and via the UI or a second UI associated with the client account, a second function associated with label generation, wherein the second function indicates a second type of metadata and a second transformation to apply to the second type of metadata; identifying, by the data security system and based on the scan, that a second data record of the plurality of data records includes second metadata that matches the second type of metadata; generating, by the data security system, a second label based on application of the second transformation to the second metadata in accordance with the function; adding, by the data security system, the second label to the second data record; and storing, by the data security system, the second data record with the second label in the database.

Aspect 6: The method of any of aspects 1 through 5, further comprising: receiving, by the data security system and via the UI or a second UI associated with the client account, a query that indicates the label; and retrieving, from the database and based on the query, a set of data records that include the label, the set of data records including the data record; and causing, by the data security system, display of the set of data records at the UI or the second UI.

Aspect 7: The method of any of aspects 1 through 6, further comprising: receiving, by the data security system and via the UI or a second UI associated with the client account, a rule associated with label generation, wherein the rule indicates a metadata criteria and a second label; identifying, by the data security system and based on the scan, that the metadata or second metadata of the data record matches the metadata criteria; adding, by the data security system, the second label to the data record based on identifying that the metadata or the second metadata of the data record matches the metadata criteria; and storing, by the data security system, the data record with the second label in the database.

Aspect 8: The method of aspect 7, further comprising: receiving, by the data security system and via the UI or a second UI associated with the client account, a second rule associated with label generation, wherein the rule indicates a second metadata criteria and a third label, wherein the second metadata criteria overlaps at least in part with the metadata criteria, wherein the second rule has a lower priority than the rule; identifying, by the data security system and based on the scan, that the metadata or the second metadata of the data record matches the metadata criteria; refraining from adding the third label to the data record based on adding the second label to the data record and based on the second rule having a lower priority than the rule.

Aspect 9: The method of aspect 8, further comprising: identifying, by the data security system and based on the scan, a second data record of the plurality of data records that includes second metadata that matches the second metadata criteria; identifying, by the data security system and based on the scan, that the second metadata does not match the metadata criteria; adding, by the data security system, the third label to the second data record based on identifying that the second metadata of the data record matches the second metadata criteria and that the second metadata does not match the metadata criteria; and storing, by the data security system, the second data record with the third label in the database.

Aspect 10: The method of any of aspects 7 through 9, further comprising: receiving, by the data security system and via the UI, the second UI, or a third UI associated with the client account, a query that indicates the second label; and retrieving, from the database and based on the query, a set of data records that include the second label, the set of data records including the data record; and causing, by the data security system, display of the set of data records at the UI, the second UI, or the third UI.

Aspect 11: The method of any of aspects 1 through 10, further comprising: receiving, by the data security system and via the UI or a second UI associated with the client account, a rule associated with label generation, wherein the rule indicates a metadata criteria and a second label; identifying, by the data security system and based on the scan, a second data record of the plurality of data records that includes second metadata that matches the metadata criteria; adding, by the data security system, the second label to the second data record based on identifying that the second metadata matches the metadata criteria; and storing, by the data security system, the second data record with the second label in the database.

Aspect 12: The method of any of aspects 1 through 11, wherein the transformation comprises a mathematical operation, and the type of metadata comprises a numeral and a unit.

Aspect 13: The method of any of aspects 1 through 12, wherein the transformation comprises a text transformation, and the type of metadata comprises a string type.

Aspect 14: The method of any of aspects 1 through 13, wherein the transformation comprises a list function, and the type of metadata comprises a list type.

Aspect 15: The method of any of aspects 1 through 14, wherein the transformation comprises a date operation, and the type of metadata comprises a date field.

Aspect 16: An apparatus comprising one or more memories storing processor-executable code, and one or more processors coupled with the one or more memories and individually or collectively operable to execute the code to cause the apparatus to perform a method of any of aspects 1 through 15.

Aspect 17: An apparatus comprising at least one means for performing a method of any of aspects 1 through 15.

Aspect 18: A non-transitory computer-readable medium storing code the code comprising instructions executable by one or more processors to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article “a” before a noun is open-ended and understood to refer to “at least one” of those nouns or “one or more” of those nouns. Thus, the terms “a,” “at least one,” “one or more,” “at least one of one or more” may be interchangeable. For example, if a claim recites “a component” that performs one or more functions, each of the individual functions may be performed by a single component or by any combination of multiple components. Thus, the term “a component” having characteristics or performing functions may refer to “at least one of one or more components” having a particular characteristic or performing a particular function. Subsequent reference to a component introduced with the article “a” using the terms “the” or “said” may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, by a data security system and via a user interface associated with a client account of the data security system, a function associated with label generation, wherein the function indicates a type of metadata and a transformation to apply to the type of metadata;

performing, by the data security system, a scan of a database that stores a plurality of data records associated with a respective plurality of computing assets associated with the client account, the plurality of data records comprising identifiers for the respective plurality of computing assets and metadata associated with the respective plurality of computing assets;

identifying, by the data security system and based on the scan, a data record of the plurality of data records that includes metadata that matches the type of metadata;

generating, by the data security system, a label based on application of the transformation to the metadata in accordance with the function;

adding, by the data security system, the label to the data record; and storing, by the data security system, the data record with the label in the database.

2. The method of claim 1, further comprising:

receiving, by the data security system, a second data record associated with a second computing asset associated with the client account for addition to the database, the second data record comprising a second identifier and second metadata associated with the second computing asset;

identifying, by the data security system, that the second metadata matches the type of metadata;

generating, by the data security system, a second label based on application of the transformation to the second metadata in accordance with the function;

adding, by the data security system, the second label to the second data record; and storing, by the data security system, the second data record with the second label in the database.

3. The method of claim 1, further comprising:

identifying, by the data security system and based on the scan, a second data record of the plurality of data records that includes second metadata that matches the type of metadata;

generating, by the data security system, a second label based on application of the transformation to the second metadata in accordance with the function;

adding, by the data security system, the second label to the second data record; and storing, by the data security system, the second data record with the label in the database.

4. The method of claim 1, further comprising:

receiving, by the data security system and via the user interface or a second user interface associated with the client account, a second function associated with label generation, wherein the second function indicates a second type of metadata and a second transformation to apply to the second type of metadata;

identifying, by the data security system and based on the scan, that the data record includes second metadata that matches the second type of metadata;

generating, by the data security system, a second label based on application of the second transformation to the second metadata in accordance with the function;

adding, by the data security system, the second label to the data record; and storing, by the data security system, the data record with the second label in the database.

5. The method of claim 1, further comprising:

receiving, by the data security system and via the user interface or a second user interface associated with the client account, a second function associated with label generation, wherein the second function indicates a second type of metadata and a second transformation to apply to the second type of metadata;

identifying, by the data security system and based on the scan, that a second data record of the plurality of data records includes second metadata that matches the second type of metadata;

generating, by the data security system, a second label based on application of the second transformation to the second metadata in accordance with the function;

adding, by the data security system, the second label to the second data record; and storing, by the data security system, the second data record with the second label in the database.

6. The method of claim 1, further comprising:

receiving, by the data security system and via the user interface or a second user interface associated with the client account, a query that indicates the label;

retrieving, from the database and based on the query, a set of data records that include the label, the set of data records including the data record; and causing, by the data security system, display of the set of data records at the user interface or the second user interface.

7. The method of claim 1, further comprising:

receiving, by the data security system and via the user interface or a second user interface associated with the client account, a rule associated with label generation, wherein the rule indicates a metadata criteria and a second label;

identifying, by the data security system and based on the scan, that the metadata or second metadata of the data record matches the metadata criteria;

adding, by the data security system, the second label to the data record based on identifying that the metadata or the second metadata of the data record matches the metadata criteria; and storing, by the data security system, the data record with the second label in the database.

8. The method of claim 7, further comprising:

receiving, by the data security system and via the user interface or the second user interface associated with the client account, a second rule associated with label generation, wherein the rule indicates a second metadata criteria and a third label, wherein the second metadata criteria overlaps at least in part with the metadata criteria, wherein the second rule has a lower priority than the rule; and identifying, by the data security system and based on the scan, that the metadata or the second metadata of the data record matches the metadata criteria;

refraining from adding the third label to the data record based on adding the second label to the data record and based on the second rule having a lower priority than the rule.

9. The method of claim 8, further comprising:

identifying, by the data security system and based on the scan, a second data record of the plurality of data records that includes second metadata that matches the second metadata criteria;

identifying, by the data security system and based on the scan, that the second metadata does not match the metadata criteria;

adding, by the data security system, the third label to the second data record based on identifying that the second metadata of the data record matches the second metadata criteria and that the second metadata does not match the metadata criteria; and storing, by the data security system, the second data record with the third label in the database.

10. The method of claim 7, further comprising:

receiving, by the data security system and via the user interface, the second user interface, or a third user interface associated with the client account, a query that indicates the second label;

retrieving, from the database and based on the query, a set of data records that include the second label, the set of data records including the data record; and causing, by the data security system, display of the set of data records at the user interface, the second user interface, or the third user interface.

11. The method of claim 1, further comprising:

receiving, by the data security system and via the user interface or a second user interface associated with the client account, a rule associated with label generation, wherein the rule indicates a metadata criteria and a second label;

identifying, by the data security system and based on the scan, a second data record of the plurality of data records that includes second metadata that matches the metadata criteria;

adding, by the data security system, the second label to the second data record based on identifying that the second metadata matches the metadata criteria; and storing, by the data security system, the second data record with the second label in the database.

12. The method of claim 1, wherein:

the transformation comprises a mathematical operation, and the type of metadata comprises a numeral and a unit.

13. The method of claim 1, wherein:

the transformation comprises a text transformation, and the type of metadata comprises a string type.

14. The method of claim 1, wherein:

the transformation comprises a list function, and the type of metadata comprises a list type.

15. The method of claim 1, wherein:

the transformation comprises a date operation, and the type of metadata comprises a date field.

16. An apparatus, comprising:

one or more memories storing processor-executable code; and one or more processors coupled with the one or more memories and individually or collectively operable to execute the code to cause the apparatus to:

receive, by a data security system and via a user interface associated with a client account of the data security system, a function associated with label generation, wherein the function indicates a type of metadata and a transformation to apply to the type of metadata;

perform, by the data security system, a scan of a database that stores a plurality of data records associated with a respective plurality of computing assets associated with the client account, the plurality of data records comprising identifiers for the respective plurality of computing assets and metadata associated with the respective plurality of computing assets;

identify, by the data security system and based on the scan, a data record of the plurality of data records that includes metadata that matches the type of metadata;

generate, by the data security system, a label based on application of the transformation to the metadata in accordance with the function;

add, by the data security system, the label to the data record; and store, by the data security system, the data record with the label in the database.

17. The apparatus of claim 16, wherein the one or more processors are individually or collectively further operable to execute the code to cause the apparatus to:

receive, by the data security system, a second data record associated with a second computing asset associated with the client account for addition to the database, the second data record comprising a second identifier and second metadata associated with the second computing asset;

identify, by the data security system, that the second metadata matches the type of metadata;

generate, by the data security system, a second label based on application of the transformation to the second metadata in accordance with the function;

add, by the data security system, the second label to the second data record; and store, by the data security system, the second data record with the second label in the database.

18. The apparatus of claim 16, wherein the one or more processors are individually or collectively further operable to execute the code to cause the apparatus to:

identify, by the data security system and based on the scan, a second data record of the plurality of data records that includes second metadata that matches the type of metadata;

generate, by the data security system, a second label based on application of the transformation to the second metadata in accordance with the function;

add, by the data security system, the second label to the second data record; and store, by the data security system, the second data record with the label in the database.

19. The apparatus of claim 16, wherein the one or more processors are individually or collectively further operable to execute the code to cause the apparatus to:

receive, by the data security system and via the user interface or a second user interface associated with the client account, a second function associated with label generation, wherein the second function indicates a second type of metadata and a second transformation to apply to the second type of metadata;

identify, by the data security system and based on the scan, that the data record includes second metadata that matches the second type of metadata;

generate, by the data security system, a second label based on application of the second transformation to the second metadata in accordance with the function;

add, by the data security system, the second label to the data record; and store, by the data security system, the data record with the second label in the database.

20. A non-transitory computer-readable medium storing code, the code comprising instructions executable by one or more processors to:

receive, by a data security system and via a user interface associated with a client account of the data security system, a function associated with label generation, wherein the function indicates a type of metadata and a transformation to apply to the type of metadata;

perform, by the data security system, a scan of a database that stores a plurality of data records associated with a respective plurality of computing assets associated with the client account, the plurality of data records comprising identifiers for the respective plurality of computing assets and metadata associated with the respective plurality of computing assets;

identify, by the data security system and based on the scan, a data record of the plurality of data records that includes metadata that matches the type of metadata;

generate, by the data security system, a label based on application of the transformation to the metadata in accordance with the function;

add, by the data security system, the label to the data record; and store, by the data security system, the data record with the label in the database.

* * * * *